(12) United States Patent
Caithness

(10) Patent No.: US 11,916,948 B2
(45) Date of Patent: *Feb. 27, 2024

(54) ANOMALY DETECTION

(71) Applicant: Senseon Tech Ltd, London (GB)

(72) Inventor: Neil Caithness, London (GB)

(73) Assignee: Senseon Tech Ltd, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/056,495

(22) Filed: Nov. 17, 2022

(65) Prior Publication Data

US 2023/0075649 A1    Mar. 9, 2023

Related U.S. Application Data

(63) Continuation of application No. 17/727,384, filed on Apr. 22, 2022, now Pat. No. 11,522,895, which is a
(Continued)

(30) Foreign Application Priority Data

Oct. 22, 2019 (GB) .................... 1915265

(51) Int. Cl.
   *H04L 9/40* (2022.01)
(52) U.S. Cl.
   CPC .............. *H04L 63/1425* (2013.01)
(58) Field of Classification Search
   CPC .................................. H04L 63/1425
   (Continued)

(56) References Cited

U.S. PATENT DOCUMENTS

| 7,681,235 B2* | 3/2010 | Chesla | G06F 21/552 |
| | | | 726/22 |
| 8,131,846 B1 | 3/2012 | Hernacki et al. | |

(Continued)

FOREIGN PATENT DOCUMENTS

| EP | 3772209 A1 | 2/2021 |
| EP | 3800863 A1 | 4/2021 |

(Continued)

OTHER PUBLICATIONS

Balasubramaniyan et al., "An architecture for intrusion detection using autonomous agents." Proceedings 14th annual computer security applications conference (Cat. No. 98EX217). IEEE, 1998. 19 pages.

(Continued)

*Primary Examiner* — Badri Narayanan Champakesan
(74) *Attorney, Agent, or Firm* — Smith Baluch LLP

(57) ABSTRACT

Computer-implemented method of detecting potential cybersecurity threats from collected data pertaining to a monitored network, the collected data comprising network data and/or endpoint data. The method comprises structuring the collected data as at least one data matrix, each row of the data matrix being a datapoint and each column corresponding to a feature. The method also comprises identifying one or more datapoints as anomalous, thereby detecting a potential cybersecurity threat. The method also comprises extracting causal information about the anomalous datapoint based on an angular relationship between a second-pass coordinate vector of the anomalous datapoint and a second-pass coordinate vector of one or more features. The second-pass coordinate vectors are determined by applying a second-pass singular value decomposition (SVD) to a residuals matrix. The residuals matrix is computed between the data matrix
(Continued)

and an approximation of the data matrix by applying a first-pass truncated SVD to the data matrix.

19 Claims, 16 Drawing Sheets

Related U.S. Application Data continuation of application No. PCT/EP2020/078643, filed on Oct. 12, 2020.

(58) Field of Classification Search
USPC .......................................................... 726/23
See application file for complete search history.

(56) References Cited

U.S. PATENT DOCUMENTS

| | | | |
|---|---|---|---|
| 8,239,668 | B1 | 8/2012 | Chen et al. |
| 8,578,494 | B1* | 11/2013 | Engler ................. G06F 21/552 |
| | | | 702/179 |
| 8,800,036 | B2* | 8/2014 | Khayam ............ H04L 63/1425 |
| | | | 713/193 |
| 9,038,178 | B1* | 5/2015 | Lin ..................... H04L 63/1425 |
| | | | 713/153 |
| 9,069,954 | B2 | 6/2015 | Anurag |
| 9,571,524 | B2 | 2/2017 | Dotan et al. |
| 9,749,342 | B1 | 8/2017 | Krage et al. |
| 9,767,663 | B2 | 9/2017 | Reske |
| 9,773,112 | B1 | 9/2017 | Rathor et al. |
| 9,787,705 | B1* | 10/2017 | Love ................... G06F 16/9024 |
| 9,800,605 | B2 | 10/2017 | Baikalov et al. |
| 9,836,183 | B1* | 12/2017 | Love ................... G06F 16/904 |
| 9,998,425 | B2 | 6/2018 | Raman et al. |
| 10,091,235 | B1 | 10/2018 | Kushwaha et al. |
| 10,104,118 | B2 | 10/2018 | Wang et al. |
| 10,109,166 | B1 | 10/2018 | Selinger et al. |
| 11,108,795 | B2* | 8/2021 | Lee ..................... G06F 21/566 |
| 11,228,604 | B2 | 1/2022 | Mistry et al. |
| 11,265,339 | B1 | 3/2022 | Mistry |
| 11,363,037 | B2* | 6/2022 | Karin ................. H04L 63/1408 |
| 11,522,895 | B2 | 12/2022 | Caithness |
| 2003/0070003 | A1 | 4/2003 | Chong et al. |
| 2005/0050336 | A1 | 3/2005 | Liang et al. |
| 2008/0155517 | A1 | 6/2008 | Yan et al. |
| 2011/0173699 | A1 | 7/2011 | Figlin et al. |
| 2012/0151588 | A1 | 6/2012 | Wang et al. |
| 2012/0174228 | A1 | 7/2012 | Giakouminakis et al. |
| 2012/0192003 | A1 | 7/2012 | Akiyama et al. |
| 2013/0097660 | A1 | 4/2013 | Das et al. |
| 2013/0298192 | A1 | 11/2013 | Kumar et al. |
| 2014/0165200 | A1 | 6/2014 | Singla |
| 2015/0135262 | A1 | 5/2015 | Porat et al. |
| 2015/0281287 | A1 | 10/2015 | Gill et al. |
| 2015/0341376 | A1 | 11/2015 | Nandy et al. |
| 2016/0006753 | A1 | 1/2016 | McDaid et al. |
| 2016/0021056 | A1 | 1/2016 | Chesla |
| 2016/0149887 | A1 | 5/2016 | Katmor et al. |
| 2016/0232353 | A1 | 8/2016 | Gupta et al. |
| 2016/0234241 | A1 | 8/2016 | Talamanchi et al. |
| 2016/0285858 | A1 | 9/2016 | Li et al. |
| 2016/0308898 | A1 | 10/2016 | Teeple et al. |
| 2016/0344762 | A1 | 11/2016 | Jou et al. |
| 2016/0373477 | A1 | 12/2016 | Moyle et al. |
| 2016/0381049 | A1 | 12/2016 | Lakhani et al. |
| 2017/0063907 | A1 | 3/2017 | Muddu et al. |
| 2017/0063917 | A1 | 3/2017 | Chesla |
| 2017/0093902 | A1 | 3/2017 | Roundy et al. |
| 2017/0214702 | A1 | 7/2017 | Moscovici et al. |
| 2017/0220801 | A1 | 8/2017 | Stockdale et al. |
| 2017/0251012 | A1 | 8/2017 | Stockdale et al. |
| 2017/0359376 | A1 | 12/2017 | Evron et al. |
| 2018/0027006 | A1 | 1/2018 | Zimmermann et al. |
| 2018/0041537 | A1 | 2/2018 | Bloxham et al. |
| 2018/0046928 | A1 | 2/2018 | Jang et al. |
| 2018/0123864 | A1 | 5/2018 | Tucker et al. |
| 2018/0183680 | A1 | 6/2018 | Chen et al. |
| 2018/0183940 | A1 | 6/2018 | Kosseifi et al. |
| 2018/0212879 | A1 | 7/2018 | Toit et al. |
| 2018/0255076 | A1 | 9/2018 | Paine |
| 2018/0316705 | A1 | 11/2018 | Tsironis |
| 2018/0316713 | A1 | 11/2018 | Tsironis |
| 2018/0316727 | A1 | 11/2018 | Tsironis |
| 2018/0332062 | A1 | 11/2018 | Ford |
| 2018/0375886 | A1 | 12/2018 | Kirti et al. |
| 2019/0052659 | A1 | 2/2019 | Weingarten et al. |
| 2019/0089678 | A1 | 3/2019 | Lam et al. |
| 2019/0173917 | A1 | 6/2019 | Sites |
| 2019/0220626 | A1 | 7/2019 | LeMasters et al. |
| 2019/0258800 | A1 | 8/2019 | Ladnai et al. |
| 2019/0260764 | A1 | 8/2019 | Humphrey et al. |
| 2019/0260785 | A1 | 8/2019 | Jenkinson et al. |
| 2019/0266324 | A1 | 8/2019 | Edwards et al. |
| 2019/0332690 | A1 | 10/2019 | Gutman et al. |
| 2019/0372934 | A1 | 12/2019 | Yehudai et al. |
| 2020/0143041 | A1 | 5/2020 | Jung et al. |
| 2020/0186465 | A1 | 6/2020 | Venkata et al. |
| 2020/0236120 | A1 | 7/2020 | Monteil et al. |
| 2020/0244673 | A1 | 7/2020 | Stockdale et al. |
| 2020/0274870 | A1 | 8/2020 | Zinar et al. |
| 2020/0285737 | A1 | 9/2020 | Kraus et al. |
| 2020/0372150 | A1 | 11/2020 | Salem et al. |
| 2020/0396190 | A1 | 12/2020 | Pickman et al. |
| 2021/0036002 | A1 | 2/2021 | Lee |
| 2021/0064762 | A1 | 3/2021 | Salji |
| 2021/0120027 | A1 | 4/2021 | Dean et al. |
| 2021/0250365 | A1 | 8/2021 | Atkinson et al. |
| 2021/0273691 | A1 | 9/2021 | Huang et al. |
| 2021/0273949 | A1 | 9/2021 | Howlett et al. |
| 2021/0273950 | A1 | 9/2021 | Lawson |
| 2021/0273953 | A1 | 9/2021 | Fellows et al. |
| 2021/0273957 | A1 | 9/2021 | Boyer et al. |
| 2021/0273958 | A1 | 9/2021 | McLean |
| 2021/0273959 | A1 | 9/2021 | Salji |
| 2021/0273960 | A1 | 9/2021 | Humphrey et al. |
| 2021/0273961 | A1 | 9/2021 | Humphrey et al. |
| 2021/0273973 | A1 | 9/2021 | Boyer et al. |
| 2021/0329016 | A1 | 10/2021 | Atkinson et al. |
| 2021/0360027 | A1 | 11/2021 | Boyer et al. |
| 2021/0397710 | A1 | 12/2021 | Cohen et al. |
| 2022/0019659 | A1 | 1/2022 | Salem et al. |

FOREIGN PATENT DOCUMENTS

| | | |
|---|---|---|
| KR | 20160011261 A | 2/2016 |
| WO | 2015191052 A1 | 12/2015 |
| WO | 2017160760 A1 | 9/2017 |
| WO | 2017160770 A1 | 9/2017 |
| WO | 2019038527 A1 | 2/2019 |
| WO | 2019243579 A1 | 12/2019 |
| WO | 2020021100 A1 | 1/2020 |
| WO | 2021171090 A1 | 9/2021 |
| WO | 2021171092 A2 | 9/2021 |
| WO | 2021171093 A1 | 9/2021 |
| WO | 2021171092 A3 | 10/2021 |
| WO | 2021236661 A1 | 11/2021 |
| WO | 2021236663 A1 | 11/2021 |

OTHER PUBLICATIONS

Caithness et al. "Anomaly detection for industrial big data." arXiv preprint arXiv:1804.02998 (2018) 9 pages.
Combined Search and Examination Report in GB Patent Application No. 2109995.7 dated Aug. 9, 2021, 3 pages.
Combined Search and Examination Report in United Kingdom Patent Application No. GB2019785.1 dated Mar. 12, 2021, 8 pages.
Extended European Search Report in European Patent Application No. 20217813.3 dated Jun. 28, 2021. 11 pages.
Hindy et al., "A taxonomy of malicious traffic for intrusion detection systems." 2018 International Conference On Cyber Situational Awareness, Data Analytics And Assessment (Cyber SA). IEEE, 2018. 4 pages.

(56) References Cited

OTHER PUBLICATIONS

International Search Report and Written Opinion in International Application No. PCT/EP2020/078643, dated Feb. 1, 2021, 21 pages.
International Search Report and Written Opinion in International Patent Application No. PCT/EP2019/066479 dated Oct. 9, 2019. 14 pages.
International Search Report and Written Opinion in International Patent Application No. PCT/EP2019/070256 dated Oct. 24, 2019. 17 pages.
Ranshous et al. "Anomaly detection in dynamic networks: a survey." Wiley Interdisciplinary Reviews: Computational Statistics 7.3 (2015): 223-247 26 pages.
Search Report under Section 17 in United Kingdom Patent Application No. GB2200435.2 dated Feb. 18, 2022, 4 pages.
Snapp et al., "The {DIDS}(Distributed Intrusion Detection System) Prototype." {USENIX} Summer 1992 Technical Conference ({USENIX} Summer 1992 Technical Conference). 1992. 7 pages.
Xie et al. "Fast low-rank matrix approximation with locality sensitive hashing for quick anomaly detection." IEEE INFOCOM 2017—IEEE Conference on Computer Communications. IEEE, 2017 10 pages.

\* cited by examiner

ANOMALY DETECTION

CROSS-REFERENCE TO REPLATED APPLICATIONS

This application is a continuation of U.S. application Ser. No. 17/727,384, filed Apr. 22, 2022, and entitled "Anomaly Detection," which is a by-pass continuation of PCT/EP2020/078643, filed Oct. 12, 2020, and entitled "Anomaly Detection," which claims priority to GB Application No. 1915265.1, filed Oct. 22, 2019, and entitled "Anomaly Detection," each of which is incorporated herein by reference in its entirety.

TECHNICAL FIELD

The present disclosure pertains generally to anomaly detection technology. The present anomaly detection techniques have various practical applications, including cyber defence, in which anomalous datapoints may be indicative of potential cybersecurity threats.

BACKGROUND

Cyber defence refers to technologies that are designed to protect computer systems from the threat of cyberattacks. In an active attack, an attacker attempts to alter or gain control of system resources. In a passive attack, an attacker only attempts to extract information from a system (generally whilst trying to evade detection). Private computer networks, such as those used for communication within businesses, are a common target for cyberattacks. An attacker who is able to breach (i.e. gain illegitimate access to) a private network may for example be able to gain access to sensitive data secured within in it, and cause significant disruption if they are able to take control of resources as a consequence of the breach. A cyberattack can take various forms. A "syntactic" attack makes use of malicious software, such as viruses, worms and Trojan horses. A piece of malicious software, when executed by a device within the network, may be able to spread throughout the network, resulting in a potentially severe security breach. Other forms of "semantic" attack include, for example, denial-of-service (DOS) attacks which attempt to disrupt network services by targeting large volumes of data at a network; attacks via the unauthorized use of credentials (e.g. brute force or dictionary attacks); or backdoor attacks in which an attacker attempts to bypass network security systems altogether.

SUMMARY

The present disclosure pertains generally to a class of data analytics technology referred to "anomaly detection", i.e. the detection of one or more anomalous datapoints in a (potentially large and complex) dataset. The present disclosure provides a novel and improved form of anomaly detection technology, as well as novel applications.

Certain aspects of the present disclosure provide a novel framework for detecting potential cybersecurity threats using a form of "unsupervised" anomaly detection. Unsupervised anomaly detection means that anomalous datapoints are detected based on their relationship to other datapoints in the dataset using unsupervised machine learning (ML) techniques, without any requirement to train a ML model(s) on examples of known anomalous data points, i.e. patterns/characteristics etc. that make a datapoint anomalous are inferred from the dataset itself, without having to explicitly or implicitly pre-define such patterns/characteristics. This is in contrast to "supervised" anomaly detection, which implicitly pre-defines such patterns/characteristics by providing examples of anomalous datapoints from which a ML model learn in training, and rules-based anomaly detection, in which such patterns/characteristics etc. are explicitly pre-defined as algorithmic rules, typically leveraging the knowledge of a domain expert. The present disclosure provides an enhanced form of anomaly detection, which is particularly useful in a cybersecurity context, but which can also be applied in other contexts.

Further aspects of the present disclosure provide an improved form of analytics technology which may be referred to herein an "anomaly reasoning". In contrast to merely identifying anomalous datapoints (anomaly detection), anomaly reasoning extracts information about the cause of an anomalous datapoint (anomaly). Such causal information is extracted in terms features, i.e. given a set of features of a datapoint identified as anomalous, anomaly reasoning can determine the relative extent to which a particular feature contributed to that datapoint being identified as anomalous. One or more of features of an anomalous datapoint which made the highest relative contribution to it being identified as anomalous may be referred to as the "causal feature(s)" of the anomalous datapoint. In a cybersecurity context, an anomalous datapoint may indicate a potential cybersecurity threat and anomaly reasoning may be applied to automatically extract a likely cause of the potential cybersecurity threat, in terms of the causal feature(s) of the anomalous datapoint. The present anomaly reasoning techniques have particular benefits in the context of cybersecurity. However, anomaly reasoning can be usefully applied more generally to other types of dataset (see below).

A first aspect of the present disclosure pertains to the application anomaly reasoning to cyber defence.

The first aspect provides a computer-implemented method of detecting potential cybersecurity threats from collected data pertaining to a monitored network, the collected data comprising at least one of network data and endpoint data, the method comprising: structuring the collected data as a data matrix, each row of the data matrix being a datapoint and each column corresponding to a feature; identifying at least one of the datapoints as anomalous, thereby detecting a potential cybersecurity threat; and extracting causal information about the anomalous datapoint based on an angular relationship between a second-pass coordinate vector of the anomalous datapoint and a second-pass coordinate vector of at least one of the features, the second-pass coordinate vectors determined by applying a second-pass singular value decomposition (SVD) to a residuals matrix, the residuals matrix computed between the data matrix and an approximation of the data matrix, by applying a first-pass truncated SVD to the data matrix.

In embodiments, the datapoint may be identified as anomalous based on: a row of the residuals matrix corresponding to the datapoint, or the second-pass coordinate vector for the datapoint.

For example, the datapoint may be identified as anomalous based on an anomaly score computed as: a sum of squared components of the corresponding row of the residuals matrix, or a sum of squared components of the second-pass coordinate vector for the datapoint.

The causal information may be extracted based on (i) the angular relationship and (ii) magnitude information about the second-pass coordinate vector of the feature.

The method may comprise applying an unsupervised classification process to an initial data matrix, the initial data matrix comprising rows corresponding to the datapoints, to classify each row of the initial data matrix in relation to a set of classes.

For example, the unsupervised classification process may comprise: applying an initial SVD to the initial data matrix, to determine an initial coordinate vector for each row of the initial data matrix, and applying an unsupervised clustering algorithm to the initial coordinate vectors to determine a plurality of clusters of those initial coordinate vectors.

The data matrix to which the first-pass SVD is applied may have (i) at least one class column indicating classes to which the datapoints are assigned (classification features) and (ii) feature columns corresponding to other features.

The above initial data matrix to which the unsupervised classification process is applied may comprise said feature columns, whereby the data points are classified based on said other features to determine the at least one class column for applying the first-pass SVD. That is to say, the unsupervised classification process may be performed to determine the classification features. For example, the data matrix may be an augmented data matrix determined by augmenting the initial data matrix with the classification features.

The datapoints may optionally be re-clustered by applying an unsupervised clustering algorithm to first-pass coordinate vectors thereof, the first-pass coordinate vectors determined in the first-pass SVD.

As an alternative to the above augmentation example, the data may be partitioned into multiple partitions based on the results of the unsupervised classification, wherein the data matrix to which the first-pass SVD is applied corresponds to a single partition of the multiple partitions, whereby the residuals matrix is specific to that single partition.

For example, the collected data may be structured into multiple data matrices, each corresponding to a different one of the partitions, and the identifying and extracting steps may be applied separately to each of the multiple data matrices (i.e. anomaly detection and reasoning may be applied separately for each partition).

Each partition may correspond to a single cluster of the plurality of clusters.

The second-pass SVD may be truncated or non-truncated.

The method may comprise the step of controlling a user interface to provide, to an analyst, the causal information about the anomalous datapoint.

The causal information may be provided in response to determining that an escalation condition is met, the escalation condition dependent on the anomaly score.

For example, the collected data may be used to create and populate a set of case records, each case record associated with a threat score, wherein at least one of the cases pertains to the anomalous datapoint and the threat score of that case is dependent on the anomaly score. The case may be rendered available via the user interface when its threat score meets the escalation condition and the causal information is provided as part of the case record.

In a cybersecurity context, each datapoint may, for example, correspond to a network endpoint, the method being applied to identify at least one anomalous network endpoint. For example, the features may pertain to multiple processes running on each endpoint.

As another example, the data matrix may correspond to a single process, each datapoint corresponding to an instance of that single process, the method being applied to identity at least one anomalous instance of that process. For example, each datapoint may correspond to a single process and a single endpoint on which an instance of that process is running.

For example, the collected data may be partitioned according to process, to obtain multiple partitions each corresponding to a different single process, wherein the identifying and extracting steps are applied separately for each partition. (Note: this is separate from the partitioning mentioned above in the context of unsupervised classification—in some embodiments, both forms of partitioning may be applied).

The features may, for example, pertain to network addresses accessed by the process instances. As another example, each datapoint may correspond to a network address, the method being applied to identify at least one anomalous network address.

A further aspect of the present invention applies the above-mentioned enhanced anomaly detection in a cybersecurity context.

The second aspect provides a computer-implemented method of detecting potential cybersecurity threats from collected data pertaining to a monitored network, the collected data comprising at least one of network data and endpoint data, the method comprising: structuring the collected data as an initial data matrix, each row of the initial data matrix being a datapoint and each column corresponding to a feature; applying an unsupervised classification process to the initial data matrix to classify each datapoint in relation to a set of classes; re-structuring the collected data as at least one data matrix for use in anomaly detection, the at least one data matrix determined using the results of the unsupervised classification process for incorporating class information into the anomaly detection; and applying anomaly detection to the at least one data matrix, thereby identifying at least one of the datapoints as anomalous using a residuals matrix, the residuals matrix computed between the data matrix and an approximation of the data matrix, by applying a truncated singular value decomposition (SVD) to the data matrix.

In embodiments, the datapoint may be identified as anomalous based on a row of the residuals matrix corresponding to the datapoint.

The method may comprise the step of extracting causal information about the anomalous datapoint based on an angular relationship between a second-pass coordinate vector of the anomalous datapoint and a second-pass coordinate vector of at least one of the features, the second-pass coordinate vectors determined by applying a second-pass SVD to the residuals matrix.

The datapoint may be identified as anomalous based on the second-pass coordinate vector of the datapoint.

The results of the unsupervised classification process may be used to determine an augmented data matrix with one or more classification features, the anomaly detection being applied to the augmented data matrix.

The collected data may be partitioned into multiple partitions based on the results of the unsupervised classification process, wherein the data matrix to which the anomaly detection is applied corresponds to a single partition of the multiple partitions, whereby the residuals matrix is specific to that single partition.

The collected data may be structured into multiple data matrices, each corresponding to a different one of the partitions, and the identifying and extracting steps are applied separately to each of the multiple data matrices. That is, anomaly detection may be applied separately for each of multiple processes, to identify any anomalous instances of that process.

The unsupervised classification process may comprise: applying an initial SVD to the initial data matrix, to determine an initial coordinate vector for each row of the initial data matrix, and applying an unsupervised clustering algorithm to the initial coordinate vectors to determine a plurality of clusters of those initial coordinate vectors.

Note that any of the features set out above in relation to the anomaly detection and/or anomaly reasoning steps of the first aspect and its embodiments may equally be applied in embodiments of the second aspect.

Although the present anomaly reasoning techniques have particular applicability to cybersecurity, it will be appreciated that the techniques are not limited in this respect and can be usefully applied to any form of dataset. Specific examples are described later, and include medical data (in which anomalous datapoint may be indicative of potential health issues) engineering data (where anomaly detection could be applied to detect potential faults or end-of-life conditions etc.), sensor data (where anomaly detection could be used to detect unusual incidents of activity recorded by a sensor(s), sensor faults etc.) etc. In all such cases, the ability to automatically infer causal information about such anomalies.

A third such aspect of the present invention provides a computer-implemented anomaly detection method, the method comprising: determining a data matrix from a set of collected data, each row of the initial data matrix being a datapoint and each column corresponding to a feature; identifying at least one of the datapoints as anomalous; and extracting causal information about the anomalous datapoint based on an angular relationship between a second-pass coordinate vector of the anomalous datapoint and a second-pass coordinate vector of at least one of the features, the second-pass coordinate vectors determined by applying a second-pass singular value decomposition (SVD) to a residuals matrix, the residuals matrix computed between the data matrix and an approximation of the data matrix, by applying a first-pass truncated SVD to the data matrix.

That is to say, although cybersecurity is considered above, the anomaly detection and reasoning steps of the first aspect can be usefully applied in other technical contexts, to other forms of collected data. All features set out as embodiments of the first or second aspects can equally be implemented in embodiments of the third aspect.

A fourth such aspect of the present invention provides a computer-implemented anomaly detection method, the method comprising: determining an initial data matrix from a set of collected data, each row of the data matrix being a datapoint and each column corresponding to a feature; applying an unsupervised classification process to the initial data matrix to classify each datapoint in relation to a set of classes; re-structuring the collected data as at least one data matrix for use in anomaly detection, the at least one data matrix determined using the results of the unsupervised classification process for incorporating class information into the anomaly detection; and applying anomaly detection to the at least one data matrix, thereby identifying at least one of the datapoints as anomalous using a residuals matrix, the residuals matrix computed between the data matrix and an approximation of the data matrix, by applying a truncated singular value decomposition (SVD) to the data matrix.

That is to say, although cybersecurity is considered above, the enhanced anomaly detection steps of the second aspect can be usefully applied in other technical contexts, to other forms of collected data. All features set out as embodiments of the first or second aspects can equally be implemented in embodiments of the fourth aspect.

As an alternative to the cybersecurity examples given above, the collected data could for example comprise:

image data, engineering data, with the method being applied to detect or predict a machine fault based on the at least one anomalous datapoint, or medical data.

Further aspects of the invention provide a computer system comprising one or more computers programmed or otherwise-configured to carry out any of the method steps herein, and a computer program comprising program instructions for programming a computer or a set of computers to carry out the method steps.

BRIEF DESCRIPTION OF FIGURES

For a better understanding of the present invention, and to show how embodiments of the same may be carried into effect, reference is made by way of example only to the following figures in which.

DETAILED DESCRIPTION

1. Example System Overview

Figure 1:
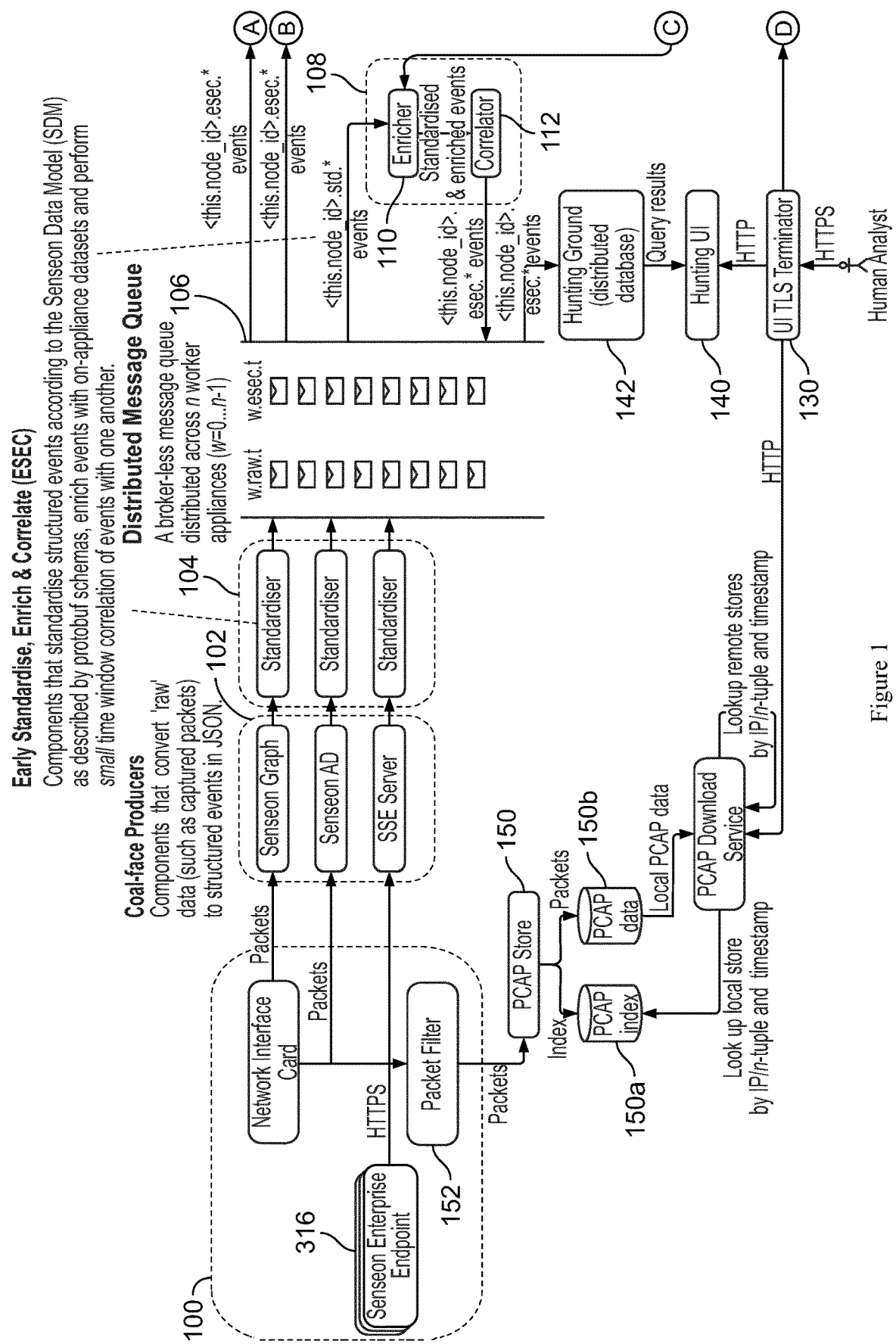
FIG. 1 shows, by way of context, a schematic function block diagram of a cyber defence platform.
Figure 1:
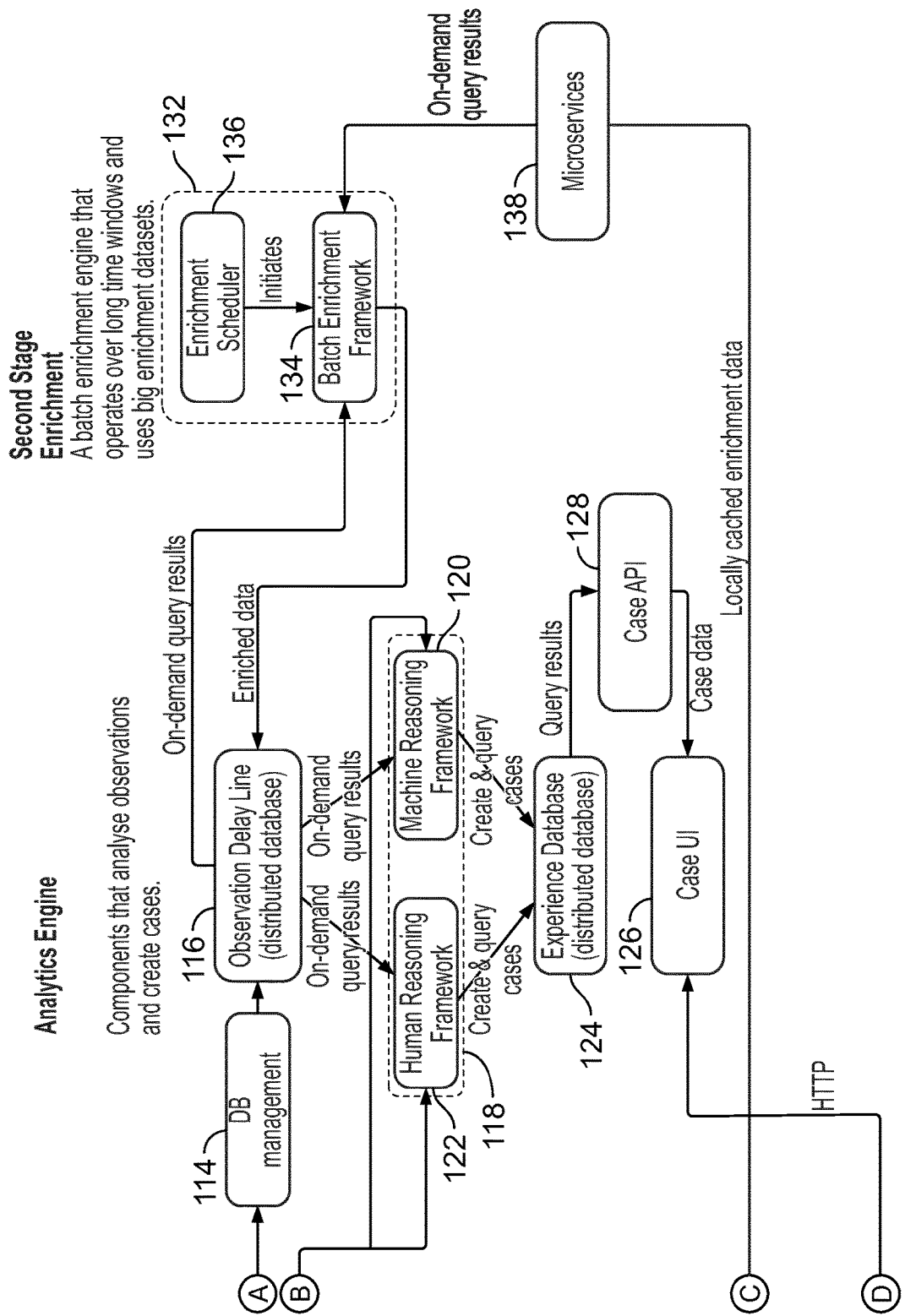

Embodiments of the present invention are described in detail below. First, there follows some useful context to a particular cybersecurity application of the present techniques, within an integrated cybersecurity platform. The integrated cyber defence platform provides overarching protection for a network against cyberattacks, through a combination of comprehensive network and endpoint data collection and organization, and advanced analytics applied to the resulting output within a machine-reasoning framework. In this context, both anomaly detection and anomaly reasoning may be applied as a component of the machine reasoning framework.

One component of this analysis is the consideration of longer-term temporal correlations between events, and in particular different types of event such as network and endpoint events. Events that appear to be related are grouped into "cases" over time, as they arrive at an analysis engine. Each case has at least one assigned threat score, denoting the threat level indicated by its constituent events. In this context, anomaly detection and anomaly reasoning may be applied within the analysis engine. The results of anomaly detection/reasoning applied to network and/or endpoint events can be a factor in the creation, population and/or escalation of cases. For example, such results can contribute to a "threat score" associated with a case (see below), possibly in combination with other factor(s). For example, the detection of an anomaly relating to a case may cause its threat score to increase, and anomaly reasoning may be used to populate the case with information about the cause of the anomaly. A cyber security expert or other user viewing the case can, in turn, use this highly-focused information to perform targeted threat assessment.

The described platform operates according to a "triangulation" model in which multiple forms of analysis may be used as a basis for threat detection. To provide effective triangulation, anomaly detection/reasoning may be applied in conjunction with other forms of analytics, such as rules-based analytics and/or analytics based on supervised machine learning or other statistical methods more generally. By way of example, a particular form of threat detection analytics formulated around the "Mitre ATT&CK framework" (or any other structured source of attack knowledge) is described below. The present anomaly detection/reasoning techniques can be applied in conjunction with such techniques to provide a highly sophisticated form of automated threat detection.

A feature of the platform it its ability to collect and link together different types of event, and in particular (i) network events and (ii) endpoint events. This occurs at various places within the system, as described below.

Network events are generated by collecting raw network data from components (sub-systems, devices, software components etc.) across a monitored network, and re-structuring the raw network data into network events. The raw network data can for example be obtained through appropriate network tapping, to provide a comprehensive overview of activity across the network.

Endpoint events are generated using dedicated endpoint monitoring software in the form of endpoint agents that are installed on endpoints of the network being monitored. Each endpoint agent monitors local activity at the endpoint on which it is installed, and feeds the resulting data (endpoint data) into the platform for analysis.

This combination of endpoint data with network data is an extremely powerful basis for cyber defence.

In a data optimization stage, observations are captured in the form of structured, timestamped events. Both network events and endpoint events are collected at this stage and enhanced for subsequent analysis. Events generated across different data collectors are standardized, as needed, according to a predefined data model. As part of the data optimization, first stage enrichment and joining is performed. This can, to some extent at least, be performed in real-time or near-real time (processing time of around 1 second or less). That is, network and endpoint events are also enriched with additional relevant data where appropriate (enrichment data) and selectively joined (or otherwise linked together) based on short-term temporal correlations. Augmentation and joining are examples of what is referred to herein as event enhancement.

In an analytics stage, these enhanced network events are subject to sophisticated real-time analytics, by an analysis engine. This includes the use of statistical analysis techniques commonly known as "machine learning" (ML). The analysis is hypothesis-based, wherein the likelihood of different threat hypotheses being true is assessed given a set of current or historic observations.

The creation and subsequent population of cases is driven by the results of analysing incoming events. A case is created for at least one defined threat hypothesis in response to an event that is classed as potentially malicious, and populated with data of that event. That is, each case is created in response to a single event received at the analysis engine. It is noted however that the event that causes a case to be created can be a joined event, which was itself created by joining two or more separate events together, an enriched event, or both.

Once a case has been created, it may be populated with data of subsequently received events that are identified as related to the case in question (which again may be joined and/or augmented events) in order to provide a timeline of events that underpin the case.

A case may alternatively or additionally be populated with data of one or more earlier events (i.e. earlier than the event or events that triggered its creation). This is appropriate, for example, where the earlier event(s) is not significant enough in itself to warrant opening a case (e.g. because it is too common), but whose potential significance becomes apparent in the context of the event(s) that triggered the creation of the case.

An event itself does not automatically create a case. An event may be subject to analysis (which may take into account other data—such as other events and/or external datasets) and it is the result of this analysis which will dictate if it will culminate in the creation of a new case or update of an existing case. A case can be created in response to one event which meets a case creation condition, or multiple events which collectively meet a case creation condition.

Generally, the threat score for a newly-created case will be low, and it is expected that a large number of cases will be created whose threat scores never become significant (because the events driving those cases turn out to be innocuous). However, in response to a threat occurring within the network being monitored, the threat score for at least one of the cases is expected to increase as the threat develops.

Another key feature of the system is the fact that cases are only rendered available via a case user interface (UI) when their threat scores reach a significance threshold, or meet some other significance condition. In other words, although a large number of cases may be created in the background, cases are only selectively escalated to an analyst, via the case UI, when they become significant according to defined significance criteria.

Case escalation is the primary driver for actions taken in response to threats or potential threats. FIG. 1 shows a schematic block diagram of the cyber defence platform, which is a system that operates to monitor traffic flowing through a network as well as the activity at and the state of endpoints of that network in order to detect and report security threats. The cyber defence platform is implemented as a set of computer programs that perform the data processing stages disclosed herein. The computer programs are executed on one or more processors of a data processing system, such as CPUs, GPUs etc. The system is shown to comprise a plurality of data collectors 102 which are also referred to herein as "coal-face producers". The role of these components 102 is to collect network and endpoint data and, where necessary, process that data into a form suitable for cyber security, analysis. One aspect of this is the collection of raw network data from components of the network being monitored and convert that raw data into structured events (network events), as described above. The raw network data is collected based on network tapping, for example.

Event standardisation components 104 are also shown, each of which receives the events outputted from a respective one of the coal-face producers 102. The standardisation components 104 standardise these structured events according to a predefined data model, to create standardized network and endpoint events.

The raw network data that is collected by the coal-face producers 102 is collected from a variety of different network components 100. The raw network data can for example include captured data packets as transmitted and received between components of the network, as well as externally incoming and outgoing packets arriving at and leaving the network respectively.

Additionally, structured endpoint events are collected using endpoint agents 316 executed on endpoints throughout the network. The endpoint agents provide structured endpoint events to the coal-face producers 102 and those events are subject to standardization, enrichment and correlation as above.

This is described in further detail below, with reference to FIG. 3.

Once standardised, the network events are stored in a message queue 106 (event queue), along with the endpoint events. For a large-scale system, the message queue can for example be a distributed message queue. That is, a message queue 106 embodied as a distributed data storage system comprising a cluster of data storage nodes (not shown in FIG. 1).

An event optimisation system 108 is shown having an input for receiving events from the message queue 106, which it processes in real-time or near real-time to provide enhanced events in the manner described below. In FIG. 1, enhanced events are denoted w.esec.t, as distinct from the "raw" events (pre-enhancement) which are denoted w.raw.t. Raw events that are stored in the message queue 106 are shown down the left hand side of the message queue (these are the standardised, structured events provided by the standardisation components 104) whereas enhanced events are shown on the right hand side. However, it will be appreciated that this is purely schematic and that the events can be stored and managed within the message queue 106 in any suitable manner.

The event enhancement system 108 is shown to comprise an enrichment component 110 and a joining component 112. The enrichment component 106 operates to augment events from the message queue 106 with enrichment data, in a first stage enrichment. The enrichment data is data that is relevant to the event and has potential significance in a cybersecurity context. It could for example flag a file name or IP address contained in the event that is known to be malicious from a security dataset. The enrichment data can be obtained from a variety of enrichment data sources including earlier events and external information. The enrichment data used to enrich an event is stored within the event, which in turn is subsequently returned to the message queue 106 as described below. In this first stage enrichment, the enrichment data that is obtained is limited to data that it is practical to obtain in (near) real-time. Additional batch enrichment is performed later, without this limitation, as described below.

The joining component 112 operates to identify short-term, i.e. small time window, correlations between events. This makes use of the timestamps in the events and also other data such as information about entities (devices, processes, users etc.) to which the events relate. The joining component 112 joins together events that it identifies as correlated with each other (i.e. interrelated) on the timescale considered and the resulting joined user events are returned to the message queue 106. This can include joining together one or more network events with one or more endpoint events where appropriate.

In FIG. 1, the joining component 112 is shown having an output to receive enriched events from the enrichment component 110 such that it operates to join events, as appropriate, after enrichment. This means that the joining component 112 is able to use any relevant enrichment data in the enriched events for the purposes of identifying short-term correlations. However, it will be appreciated that in some contexts at least it may be possible to perform enrichment and correlation in any order or in parallel.

An observation database manager 114 (storage component) is shown having an input connected to receive events from the message queue 106. The observation database manager 114 retrieves events, and in particular enhanced (i.e. enriched and, where appropriate, joined) events from the message queue 106 and stores them in an observation delay line 116 (observation database). The observation delay line 116 may be a distributed database. The observation delay line 116 stores events on a longer time scale than events are stored in the message queue 106.

A batch enrichment engine 132 performs additional enrichment of the events in the observation delay line 116 over relatively long time windows and using large enrichment data sets. A batch enrichment framework 134 performs a batch enrichment process, in which events in the observation delay line 116 are further enriched. The timing of the batch enrichment process is driven by an enrichment scheduler 136 which determines a schedule for the batch enrichment process. Note that this batch enrichment is a second stage enrichment, separate from the first stage enrichment that is performed before events are stored in the observation delay line 116.

Figure 3:
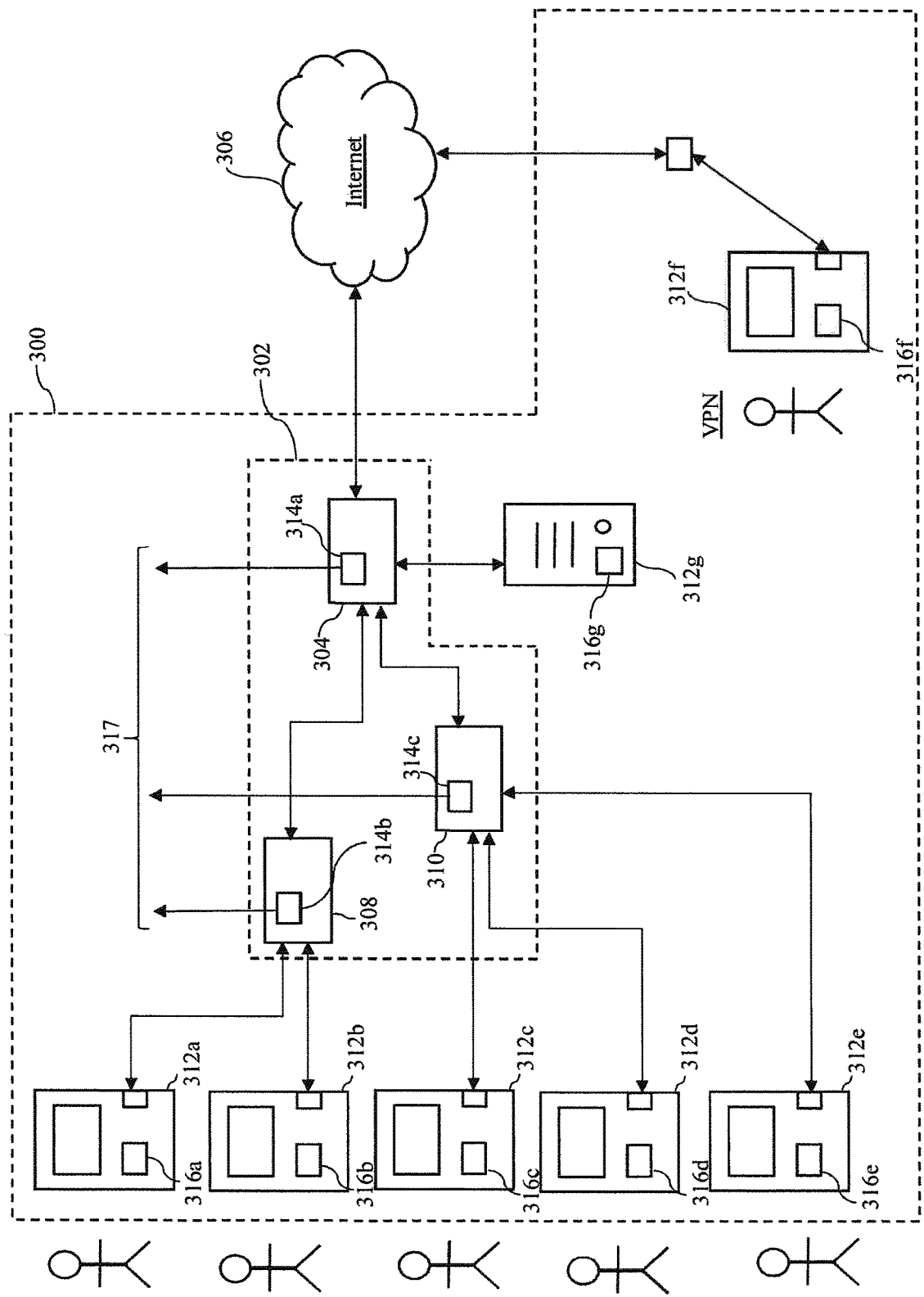
FIG. 3 shows a schematic block diagram of a network which may be subject to a cybersecurity analysis.

Network and Endpoint Events:

FIG. 3 shows a schematic block diagram of an example network 300 which is subject to monitoring, and which is a private network. The private network 300 is shown to comprise network infrastructure, which can be formed of various network infrastructure components such as routers, switches, hubs etc. In this example, a router 304 is shown via which a connection to a public network 306 is provided such as the Internet, e.g. via a modem (not shown). This provides an entry and exit point into and out of the private network 300, via which network traffic can flow into the private network 300 from the public network 306 and vice versa. Two additional network infrastructure component 308, 310 are shown in this example, which are internal in that they only have connections to the public network 306 via the router 304. However, as will be appreciated, this is purely an example, and, in general, network infrastructure can be formed of any number of components having any suitable topology.

In addition, a plurality of endpoint devices 312a-312f are shown, which are endpoints of the private network 300. Five of these endpoints 312a-312e are local endpoints shown directly connected to the network infrastructure 302, whereas endpoint 312f is a remote endpoint that connects remotely to the network infrastructure 302 via the public network 306, using a VPN (virtual private network) connection or the like. It is noted in this respect that the term endpoint in relation to a private network includes both local endpoints and remote endpoints that are permitted access to the private network substantially as if they were a local endpoint. The endpoints 312a-312f are user devices operated by users (client endpoints), but in addition one or more server endpoints can also be provided. By way of example, a server 312g is shown connected to the network infrastructure 302, which can provide any desired service or services within private network 300. Although only one server is shown, any number of server endpoints can be provided in any desired configuration.

For the purposes of collecting raw network data, a plurality of network data capture component 314a-314c are provided. These can for example be network taps. A tap is a component which provides access to traffic flowing through the network 300 transparently, i.e. without disrupting the flow of network traffic. Taps are non-obtrusive and generally non-detectable. A tap can be provided in the form of a dedicated hardware tap, for example, which is coupled to one or more network infrastructure components to provide access to the raw network data flowing through it. In this example, the taps 314a, 314b and 314c are shown coupled to the network infrastructure component 304, 308 and 310 respectively, such that they are able to provide, in combination, copies 317 of any of the raw network data flowing through the network infrastructure 302 for the purposes of monitoring. It is this raw network data that is processed into structured network events for the purpose of analysis.

Figure 2:
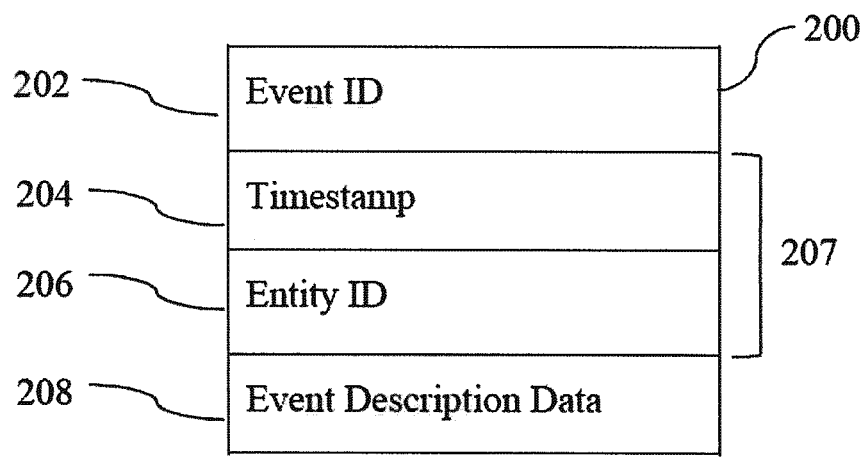
FIG. 2 shows a highly schematic representation of a network event.

FIG. 2 shows a schematic illustration of certain high level structure of a network event 200. The network event 200 is shown to comprise a timestamp 204, an entity ID 206 and network event description data (network event details) 208. The timestamp 204 and entity ID 206 constitute metadata 207 for the network event details 208.

The network event description data 208 provides a network event description. That is, details of the activity recorded by the network event that has occurred within the network being monitored. This activity could for example be the movement of a network packet or sequence of network packets through infrastructure of the network, at a particular location or at multiple locations within the network.

The network event data 208 can for example comprise one or more network event type indicators identifying the type of activity that has occurred. The entity ID 206 is an identifier of an entity involved in the activity, such as a device, user, process etc. Where multiple entities are involved, the network event can comprise multiple network event IDs. Two important forms of entity ID are device ID (e.g. MAC address) and network address (e.g. IP address, transport address (IP address plus port) etc.), both of which may be included in a network event. As well as being used as part of the analysis (in conjunction with the timestamps 204), entity IDs 206 and network event description data 208 can be used as a basis for querying enrichment data sources for enrichment data.

The timestamp 204 denotes a timing of the activity by the network event 200. Such timestamps are used as a basis for associating different but related network events, together with other information in the network event 200 such as the entity ID 206 or IDs it contains.

The network event 200 can have structured fields in which this information is contained, such as a timestamp field, one or more entity ID fields and one more network event description fields.

The network event 200 is shown to comprise a network event identifier (ID) 202 which uniquely identifies the network event 200.

Returning to FIG. 3, for the purpose of collecting endpoint data, endpoint monitoring software (code) is provided which is executed on the endpoints of the network 300 to monitor local activity at those endpoints. This is shown in the form of endpoint agents 316a-316g (corresponding to endpoint agents 316 in FIG. 1) that are executed on the endpoints 312a-312g respectively. This is representative of the fact that endpoint monitoring software can be executed on any type of endpoint, including local, remote and/or server endpoints as appropriate. This monitoring by the endpoint agents is the underlying mechanism by which endpoint events are collected within the network 300.

Figure 4:
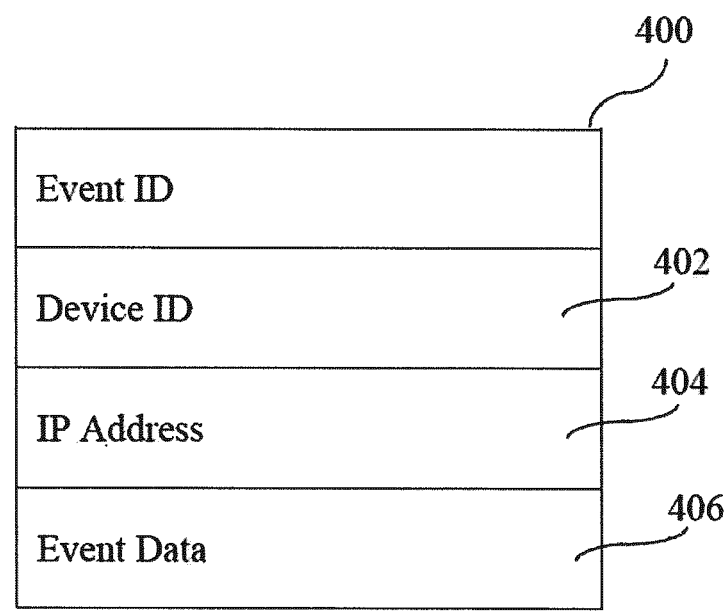
FIG. 4 shows a highly schematic representation of an endpoint event.

FIG. 4 shows a schematic illustration of a certain high level structure of an endpoint event 400.

The endpoint event 400 is shown to comprise at least one endpoint identifier, such as a device identifier (e.g. MAC address) 402 and network (e.g. IP) address 404 of the endpoint to which it relates, and endpoint event description data 406 that provides details of the local activity at the endpoint in question that triggered the creation of the endpoint event 400.

One example of endpoint activity that may be valuable from a cyber defence perspective is the opening of a connection at an endpoint. For example, a TCP/IP connection is uniquely defined by a five-tuple of parameters: source IP address (IP address of the endpoint being monitored), source port, destination IP address (IP address of an e.g. external endpoint to which the connection is being opened), destination port, and protocol. A useful endpoint event may be generated and provided to the platform for analysis when an endpoint opens a connection, in which the five-tuple defining the connection is recorded, and well as, for example, an indication of a process (application, task, etc.) executed on the endpoint that opened the connection.

As noted, one of the key features of the present cyber defence platform is its ability to link together interrelated network and endpoint events. Following the above example, by linking and endpoint event recording the opening of a connection and details of the process that opened it to network events recording the flow of traffic along that connection, it becomes possible to link specific flows of network traffic to that specific process on that endpoint.

Additional examples of endpoint information that can be captured in endpoint events include information about processes running on the endpoint (a process is, broadly, a running program), the content of files on the endpoint, user accounts on the endpoint and applications installed on the endpoint. Again, such information can be linked with any corresponding activity in the network itself, to provide a rich source of information for analysis.

Such linking can occur within the platform both as part of the real-time joining performed by the joining component 112.

However, network and endpoint events can also be linked together as part of the analysis performed by the analysis engine that is inherently able to consider links between events over longer time-scales, as will now be described.

Event Driven, Case-Based Analysis:

Returning to FIG. 1, the analysis engine, labelled 118, is shown having inputs connected to the event queue 106 and the observation delay line 116 for receiving events for analysis. The events received at the analysis engine 118 from the event queue 106 directly are used, in conjunction with the events stored in the observation delay line 116, as a basis for a sophisticated cyber security analysis that is applied by the analysis engine 118. Queued events as received from the message queue 106 permit real-time analysis, whilst the observation database 116 provides a record of historical events to allow threats to be assessed over longer time scales as they develop.

The analysis applied by analysis engine 118 is an event-driven, case-based analysis as will now be described.

As indicated above, the analysis is structured around cases herein. Cases are embodied as case records that are created in an experience database 124 (which may also be a distributed database).

Case creation is driven by events that are received at the analysis engine from the message queue 106, in real-time or near-real time.

Case creation can also be driven by events that are stored in the observation delay line 116. For example, it may be that an event is only identified as potentially threat-related when that event has been enriched in the second stage enrichment.

Once created, cases are developed by matching subsequent events received from the message queue 106 to existing cases in the experience database 124.

Events stored in the observation delay line 116 may also be matched to existing cases. For example, it may be that the relevance of a historic event only becomes apparent when a later event is received.

Thus, over time, a significant case will be populated with a time sequence of interrelated events, i.e. events that are potentially related to a common security threat, and as such exhibit a potential threat pattern.

Incoming events can be matched to existing cases using defined event association criteria, as applied to the content of the events—in particular the timestamps, but also other information such as entity identifiers (device identifier, IP address etc.). These can be events in the event queue 106, the observation delay line 116, or spread across both. Three key pieces of metadata that are used as a basis for linking events in this way are:

timestamps, endpoint devices, and/or specific endpoint information such as:

endpoint host name endpoint open sockets

IP address.

These can be multiple pieces of metadata of each type, for example source and destination IP addressed. Such metadata of cases is derived from the event or events on which the case is based. Note the above list is not exhaustive, and the types of data can be used as a basis for event linking.

For example, events may be associated with each other based on IP address where a source IP address in one event matches a destination IP address in another, and those events are within a given time window. IP addresses provide one mechanism by which endpoint events can be matched with related network events.

As another example, open sockets on an endpoint are a valuable piece of information in this context, as they are visible to the endpoint agent on the endpoint and associate specific processes running on that endpoint with specific network connections ("conversations"). That is, a socket associated with a process running on an endpoint (generally the process that opened the socket) can be associated with a specific five-tuple at a particular moment in time. This in turn can be matched to network activity within that conversation, for example by matching the five-tuple to the header data of packets tapped from the network. This in turn allows that network activity to be matched to a specific socket and the process associated with it. The endpoint itself can be identified by host name, and the combination of host name, five tuple and time is unique (and in many cases the five tuple and time will be unique depending on the network configuration and where the communication is going). This may also make use of the time-stamps in the network and endpoint events, as the association between sockets and network connections is time limited, and terminates when a socket is closed.

As noted already, in networking, a five-tuple is a tuple of (source IP, destination IP, source port, destination port, transport protocol). This uniquely identifies a network connection within relatively small time windows. In order to match events based on network connection, a hash of the five tuple can be computed from all network data and from endpoint process connection data (data relating to the network conversations individual processes on the endpoint are engaged in). By ensuring that all endpoint data also contains the host name (derived from the endpoint software), this allows any network event to be correlated with any endpoint event (network 5 tuple hash→endpoint 5 tuple hash→host name) and vice versa. This provides an efficient mechanism for linking specific network connections to specific programs (processes). Such techniques can also be used to link network activity to other event description data, e.g. a specific user account on an endpoint.

As noted, each case is assigned at least one threat score, which denotes the likelihood of the threat hypothesis (or threat hypotheses) to which the case relates. Significance in this context is assessed in terms of threat scores. When the threat score for a case reaches a significance threshold or meets some other significance condition, this causes the case to be rendered accessible via a case user interface (UI) 126.

Access to the cases via the case UI 126 is controlled based on the threat scores in the case records in the experience database 124. A user interface controller (not shown) has access to the cases in the experience database 124 and their threat scores, and is configured to render a case accessible via the case UI 126 in response to its threat score reaching an applicable significance threshold.

Such cases can be accessed via the case UI 126 by a human cyber defence analyst. In this example, cases are retrieved from the experience database 124 by submitting query requests via a case API (application programming interface) 128. The case (UI) 126 can for example be a web interface that is accessed remotely via an analyst device 130.

Thus within the analysis engine there are effectively two levels of escalation:—

Case creation, driven by individual events that are identified as potentially threat-related. Escalation of cases to the case UI 126, for use by a human analyst, only when their threat scores become significant, which may only happen when a time sequence of interrelated events has been built up over time.

As an additional safeguarding measure, the user interface controller may also escalate a series of low-scoring cases related to a particular entity to the case UI 126. This is because a series of low-scoring cases may represent suspicious activity in themselves (e.g. a threat that is evading detection). Accordingly, the platform allows patterns of low-scoring cases that are related by some common entity (e.g. user) to be detected, and escalated to the case UI 126. That is, information about a set of multiple cases is rendered available via the case US 126, in response to those cases meeting a collective significance condition (indicating that set of cases as a whole is significant).

The event-driven nature of the analysis inherently accommodates different types of threats that develop on different time scales, which can be anything from seconds to months. The ability to handle threats developing on different timescales is further enhanced by the combination or real-time and non-real time processing within the system. The real-time enrichment, joining and providing of queued events from the message queue 106 allows fast-developing threats to be detected sufficiently quickly, whilst the long-term storage of events in the observation delay line 116, together with batch enrichment, provide a basis for non-real time analysis to support this.

The above mechanisms can be used both to match incoming events from the message queue 106 and events stored in the observation delay line 116 (e.g. earlier events, whose relevance only becomes apparent after later event(s) have been received) to cases. Appropriate timers may be used to determine when to look for related observations in the observation delay line 116 based on the type of observation, after an observation is made. Depending on the attacker techniques to which a particular observation relates, there will be a limited set of possible related observations in the observation delay line 116. These related observations may only occur within a particular time window after the original observation (threat time window). The platform can use timers based on the original observation type to determine when to look for related observations. The length of the timer can be determined based on the threat hypothesis associated with the case.

Analysis Framework:

The analysis engine is shown to comprise a machine reasoning framework 120 and a human reasoning framework 122. The machine reasoning framework 120 applies computer-implemented data analysis algorithms to the events in the observation delay line 116, such as ML techniques.

Individual observations may be related to other observations in various ways but only a subset of these relationships will be meaningful for the purpose of detecting threats. The analysis engine 118 uses structured knowledge about attacker techniques to infer the relationships it should attempt to find for particular observation types.

This can involve matching a received event or sets of events to known tactics that are associated with known types of attack (attack techniques). Within the analysis engine 118, a plurality of analysis modules ("analytics") are provided, each of which queries the events (and possibly other data) to detect suspicious activity. Each analytic is associated with a tactic and technique that describes respective activity it can find. A hypothesis defines a case creation condition as a "triggering event", which in turn is defined as a specific analytic result or set of analytic results that triggers the creation of a case (the case being an instance of that hypothesis). A hypothesis also defines a set of possible subsequent or prior tactics or techniques that may occur proximate in time to the triggering events (and related to the same, or some of the same, infrastructure) and be relevant to proving the hypothesis. Because each hypothesis is expressed as tactics or techniques, there may be many different analytics that can contribute information to a case. Multiple hypotheses can be defined, and cases are created as instances of those hypotheses in dependence on the analysis of the events. Tactics are high level attacker objectives like "Credential Access", whereas techniques are specific technical methods to achieve a tactic. In practice it is likely that many techniques will be associated with each tactic. For example, it might be that after observing a browser crashing and identifying it as a possible symptom of a "Drive-by Compromise" technique (and creating a case in response), another observation proximate in time indicating the download of an executable file may be recognized as additional evidence symptomatic of "Drive-by Compromise" (and used to build up the case). Drive-by Compromise is one of a number of techniques associated with an initial access tactic. As another example, an endpoint event may indicate that an external storage device (e.g. USB drive) has been connected to an endpoint and this may be matched to a potential a "Hardware Additions" technique associated with the initial access tactic. The analysis engine 118 then monitors for related activity such as network activity that might confirm whether or not this is actually an attack targeting the relevant infrastructure.

This is performed as part of the analysis of events that is performed to create new cases and match events to existing cases. As indicated, this can be formulated around the "MITRE ATT&CK framework". The MITRE ATT&CK framework is a set of public documentation and models for cyber adversary behaviour. It is designed as a tool for cyber security experts. In the present context, the MITRE framework can be used as a basis for creating and managing cases. In the context of managing existing cases, the MITRE framework can be used to identify patterns of suspect (potentially threat-related behaviour), which in turn can be used as a basis for matching events received at the analysis engine 118 to existing cases. In the context of case creation, it can be used as a basis for identifying suspect events, which in turn drives case creation. This analysis is also used as a basis for assigning threat scores to cases and updating the assigned threat scores as the cases are populated with additional data. However it will be appreciated that these principles can be extended to the use of any structured source of knowledge about attacker techniques. The above examples are based on tactics and associated techniques defined by the Mitre framework.

Case Content:

Each case record is populated with data of the event or events which are identified as relevant to the case. Preferably, the events are captured within the case records such that a timeline of the relevant events can be rendered via the case UI 126. A case provides a timeline of events that have occurred and a description of why it is meaningful, i.e. a description of a potential threat indicated by those events.

In addition to the event timeline, a case record contains attributes that are determined based on its constituent events. Four key attributes are:

people (users)
processes
devices
network connections

A case record covering a timeline of multiple events may relate to multiple people, multiple devices and multiple users. Attribute fields of the case record are populated with these attributed based on its constituent events.

A database case schema dictates how cases are created and updated, how they are related to each other, and how they are presented at the case UI 126.

Figure 5:
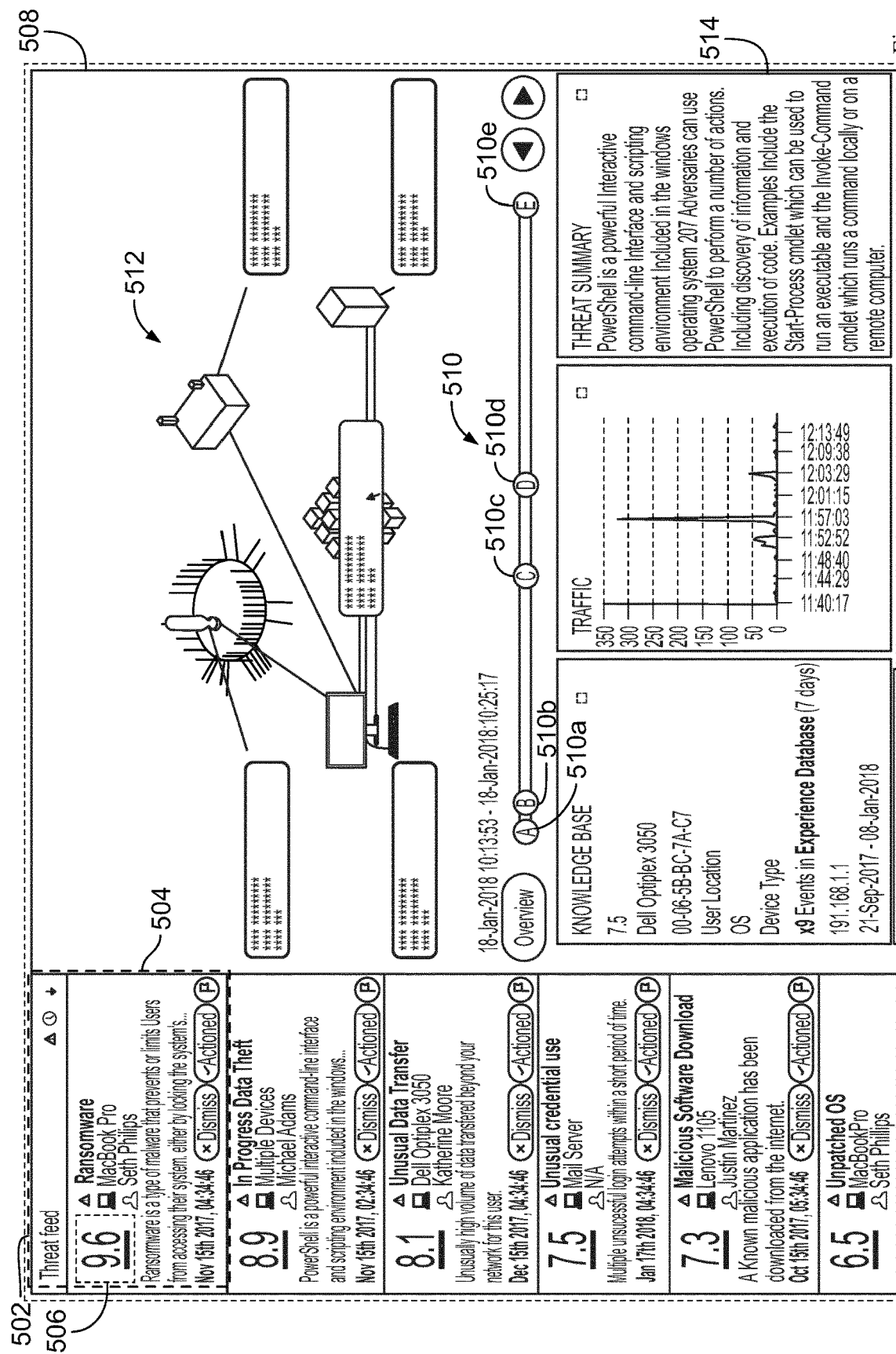
FIG. 5 shows an example layout of a case user interface.
Figure 5A:
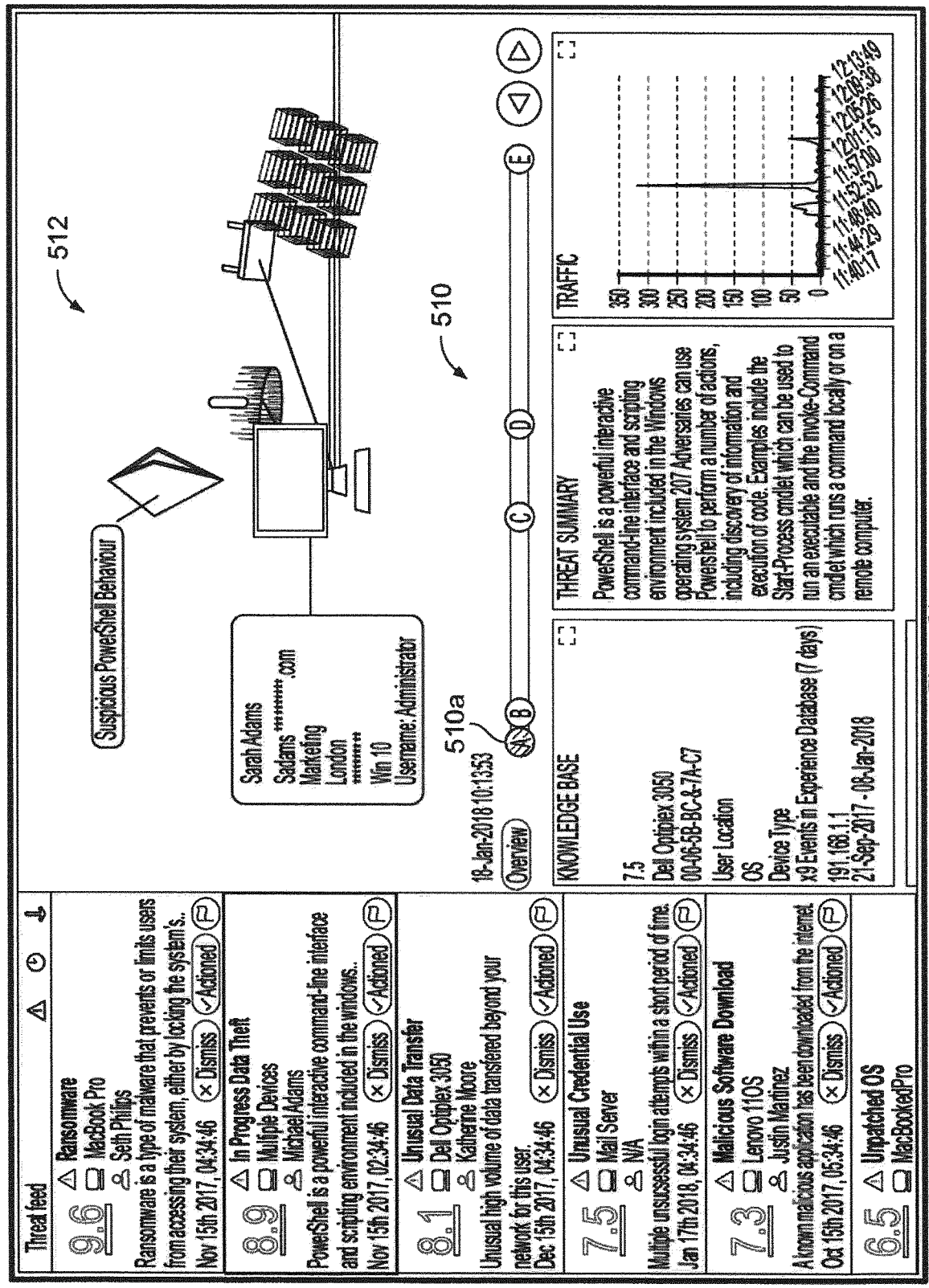
FIGS. 5a to 5e shows a case user interface dynamically responding to a series of user inputs.
Figure 5B:
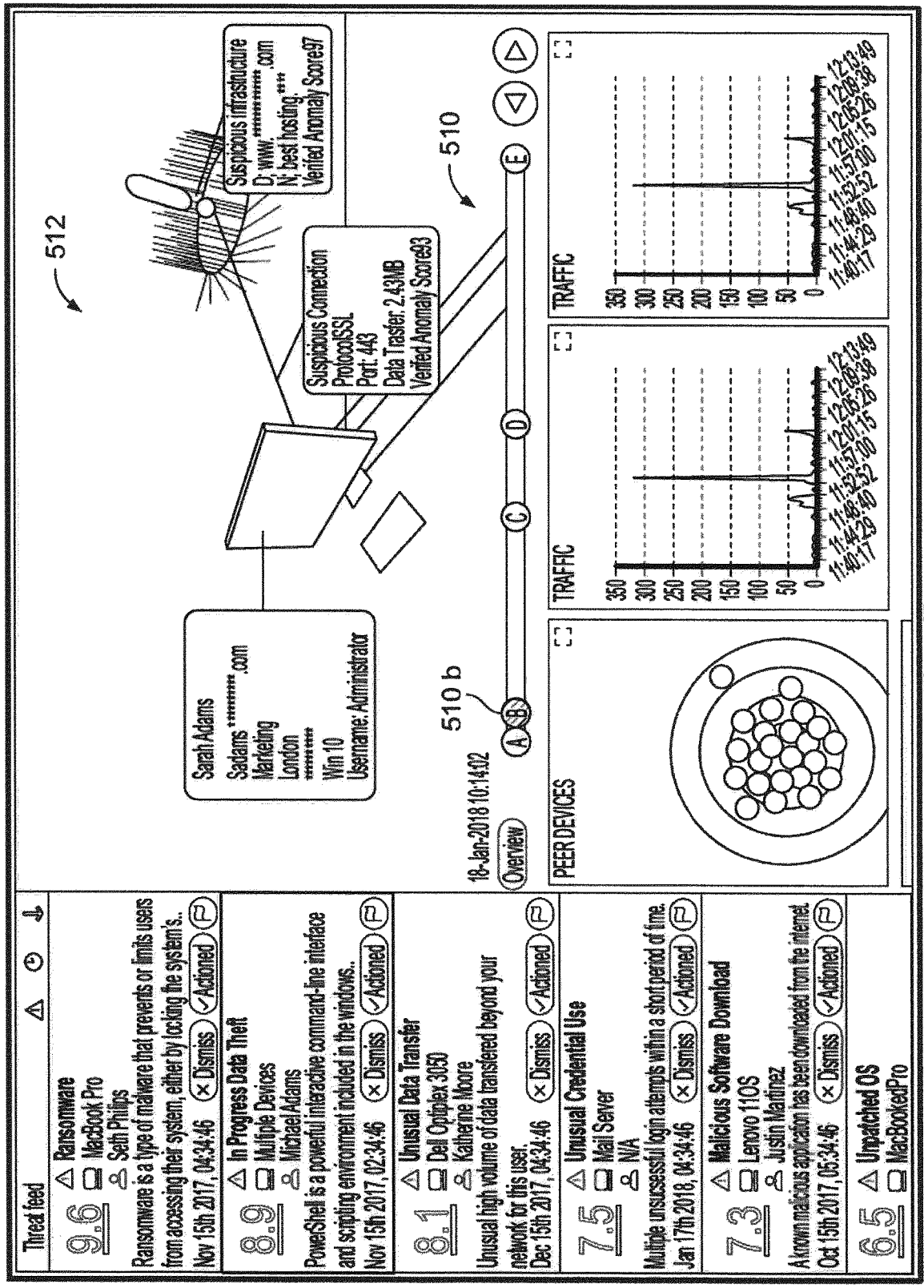
Figure 5C:
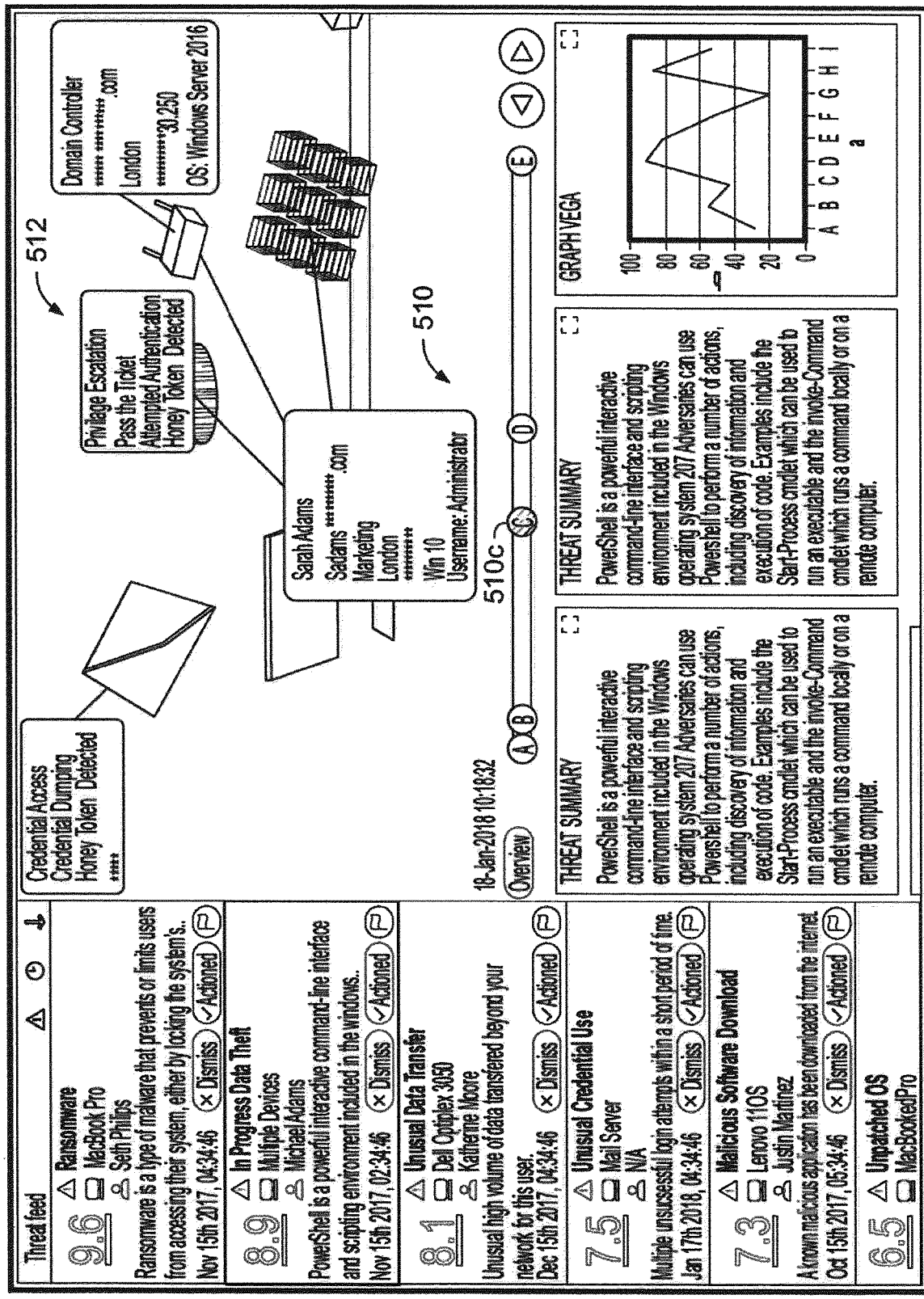
Figure 5D:
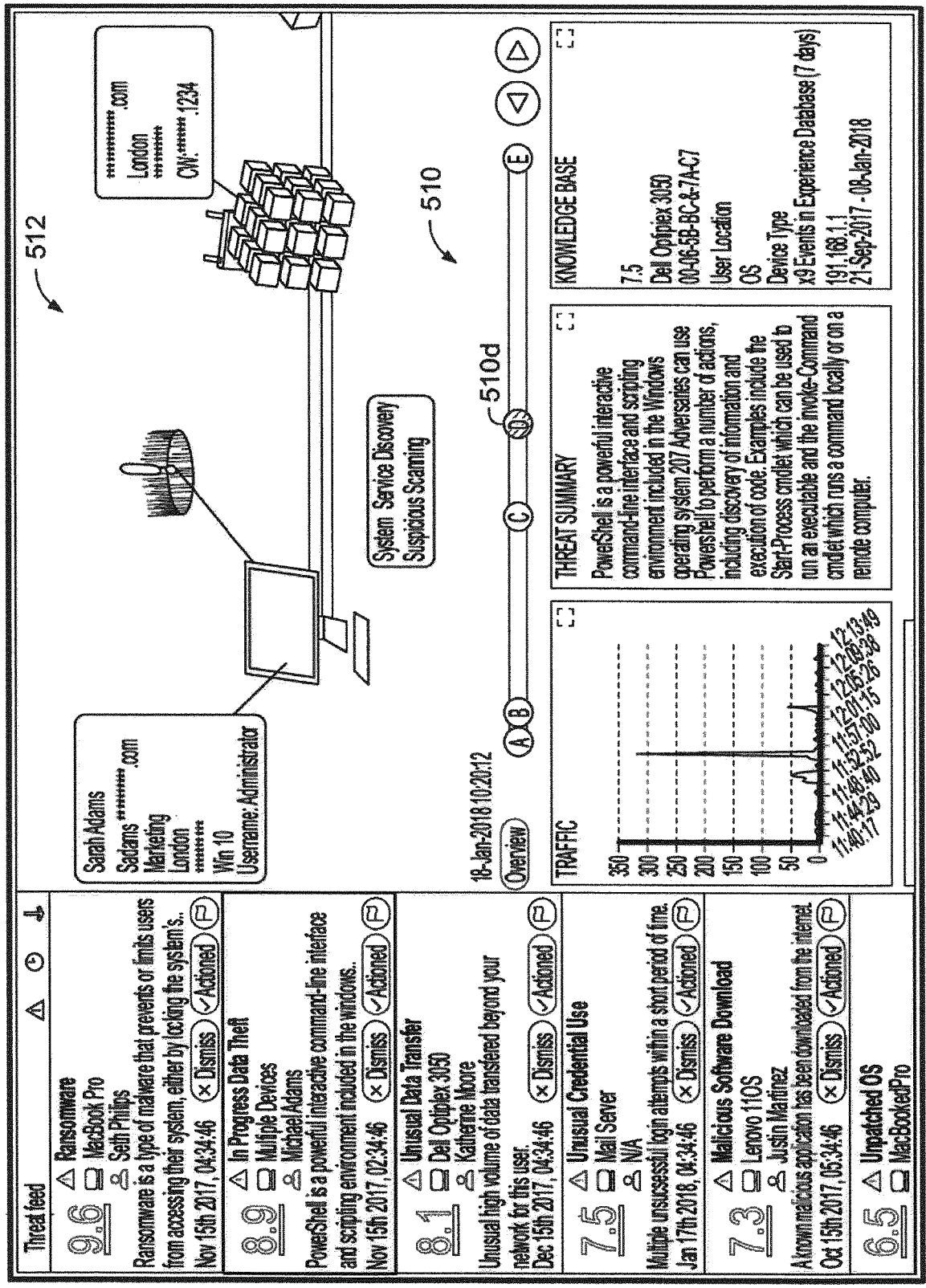
Figure 5E:
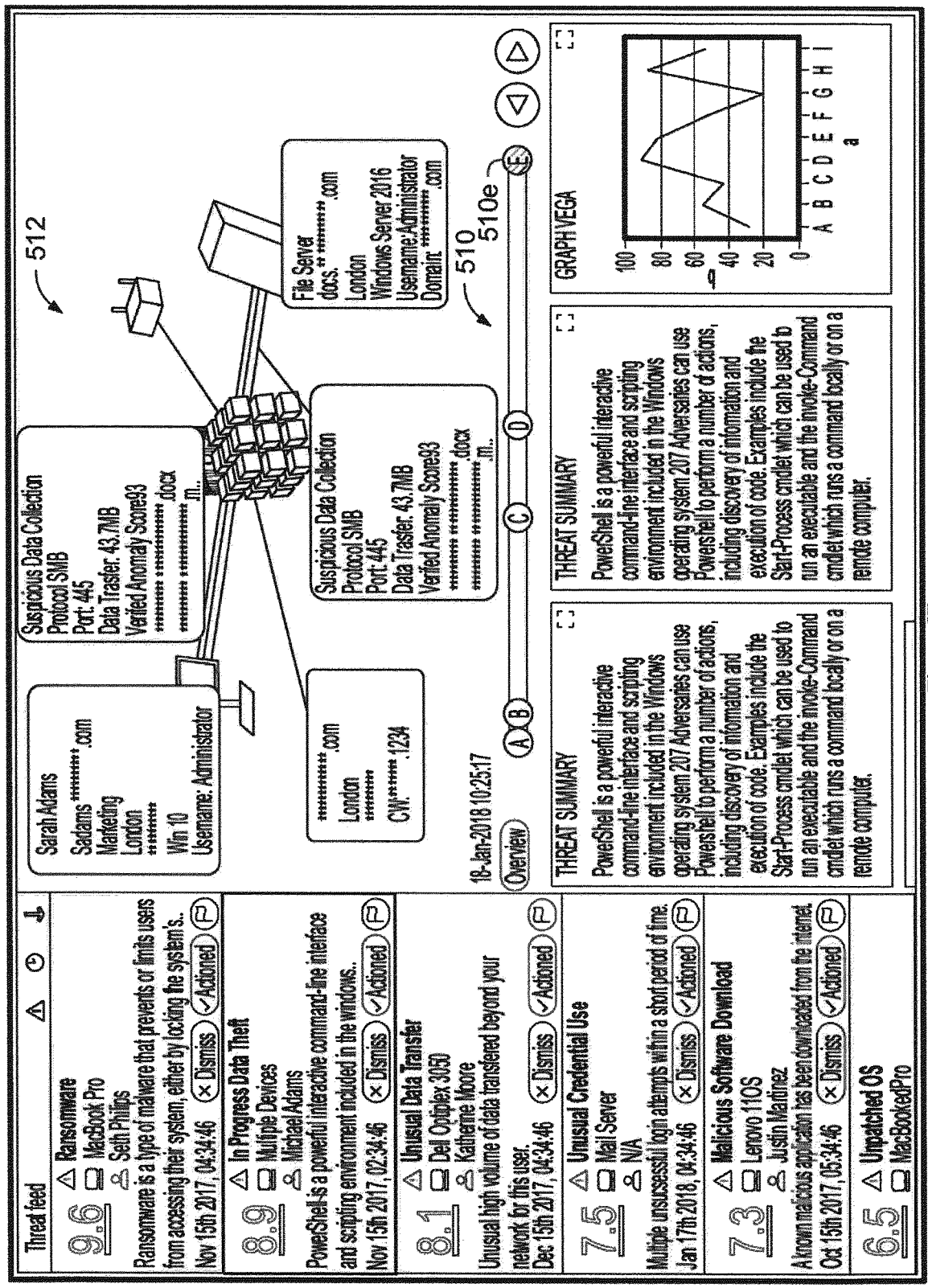

Case User Interface:

FIG. 5 shows an example of a page rendered by the case UI 126 at the analyst device 130. A list of cases 502 is shown, each of which is selectable to view further details of the case in question. Cases are only displayed in the case list 502 if their respective threats scores have reached the required thresholds. The cases in the case list 502 are shown ordered according to threat score. By way of example, the first case 504 in the case list 502 has a threat score of 9.6 (labelled as element 506). Further details of the currently selected case are shown in a region 508 adjacent to the case list 502. In particular, a timeline 510 of the events on which the case is based is shown. That is, the events with which the case is populated in the experience database 124. In addition, a graphical illustration 512 of network components to which those events relate is shown in association with the timeline 510. This can, for example, include endpoints, infrastructure components, software components and also external components which components of the network are in communication with. Additional information that is relevant to the case is also shown, including a threat summary 514 that provides a natural language summary of the threat to which the case relates. This additional information is provided in the form of "widgets" (separable threat information elements), of which the threat summary 514 is one.

As shown in FIGS. 5A through 5E, the timeline 510 comprises selectable elements corresponding to the underlying events, which are labelled 510a to 510e respectively. This can be seen, selecting these timeline elements causes the accompanying graphical representation 512 to be updated to focus on the corresponding network components. The widgets below the timeline are also updated to show the information that is most relevant to the currently selected timeline element.

Enrichment Micro Services:

Returning to FIG. 1, micro services 138 are provided, from which enrichment data can be obtained, both by the batch enrichment framework 134 (second stage enrichment) and the enrichment component 110 (first stage enrichment). These can for example be cloud services which can be queried based on the events to obtain relevant enrichment data. The enrichment data can be obtained by submitting queries to the micro services based on the content of the events. For example, enrichment data could be obtained by querying based on IP address (e.g. to obtain data about IP addresses known to be malicious), file name (e.g. to obtain data about malicious file names) etc.

Hunting Ground:

In addition to the case UI 126, a "hunting" UI 140 is provided via which the analyst can access recent events from the message queue 106. These can be events which have not yet made it to the observation delay line 116, but which have been subject to first stage enrichment and correlation at the event enhancement system 108. Copies of the events from the message queue 106 are stored in a hunting ground 142, which may be a distributed database and which can be queried via the hunting UI 140. This can for example be used by an analyst who has been alerted to a potential threat through the creation of a case that is made available via the case UI 126, in order to look for additional events that might be relevant to the potential threat.

In addition, copies of the raw network data itself, as obtained through tapping etc., are also selectively stored in a packet store 150. This is subject to filtering by a packet filter 152, according to suitable packet filtering criteria, where it can be accessed via the analyst device 130. An index 150a is provided to allow a lookup of packet data 150b, according to IP address and timestamps. This allows the analyst to trace back from events in the hunting ground to raw packets that relate to those events, for example.

2. Anomaly Detection Overview

A singular value decomposition (SVD) models high dimensional data points with an accurate, low dimensional model. So, residuals of this low-rank approximation show the location of model errors. The residual sum of squares (RSS) then shows the accumulation of errors per observation and equates to a measure of anomaly.

In symbolic notation the SVD of an N-by-M matrix X is the factorization $X=UDV^T$. Now consider the K<M low dimensional approximation $X_K=U_K D_K V_K^T$. (The subscripted K notation here indicates using the low dimensional truncated matrices in constructing the approximation, i.e. just the first K columns of U, D and V.) Residuals of the approximation $R=X-X_K$ show the location of model errors by the magnitude of their departure from zero, and the residual sum of squares (RSS, the row-wise sum of the squared residuals) shows the accumulation of errors per observation. This is the anomaly score $A_i$.

Note, although upper-case letters are used, the values N, M and K are scalars (an alternative convention would write scalar values in lower case, i.e. as n, m and k respectively in this instance).

Note that the factorization $UDV^T$ exists and is unique for any rectangular matrix X consisting of real numeric values. If the columns of X have been centred (i.e. have mean of zero achieved by subtracting the column mean from each element of the column) and standardized (i.e. have standard deviation of one achieved by dividing elements of the column by the column standard deviation) then the SVD of X produces an exactly equivalent outcome to the eigendecomposition of the covariance matrix of X that is usually called a Principal Components Analysis (PCA).

The term 'anomaly' is distinguished from an outlier in the sense of a statistical edge case. This distinction is important because the present techniques involve a specific mathematical transform that converts anomalies to outliers. The matrix of residuals R provides both a measure of observation anomaly (the RSS scores) and, by doing a second-pass SVD on R, an interpretation of the driving (causal) features of the anomalies.

An anomaly may be defined as an observation which deviates so much from other observations as to arouse suspicion that it was generated by a different mechanism (see e.g. Hawkins, D. (1980). Identification of Outliers. Chapman and Hall, London.)

3. Anomaly Detection and Reasoning Method

Embodiments of the invention will now be described in detail. A two-stage method is described with reference to FIGS. 6, 7A and 7B. The method may be described as an anomaly detection method, however the second-stage of the method provides anomaly reasoning in the above sense, leveraging anomaly detections obtained in the first stage.

Both stages are based on a "singular value decomposition" (SVD), as explained in detail below. Given a matrix Z, a SVD composition of Z is a matrix factorization which can be expressed mathematically as:

$$Z=UDV^T,$$

in which D is (in general) a rectangular diagonal matrix, i.e. in which all non-diagonal components are non-zero. The diagonal components of D are called "singular values". In general, D can have non-zero singular values or a mixture of zero and non-zero singular values. The non-zero singular values of D are equal to the square roots of the non-zero eigen values of the matrix $ZZ^T$, and are non-increasing, i.e.

$$\mathrm{Diag}(D)=(D_0,D_1,D_3,D_4,\ldots)$$

where $D_{k-1} \geq D_k$ for all k.

For an M×N matrix Z, U is an M×M matrix, D is an M×N matrix and V is an N×N matrix (the superscript T represents matrix transposition). Note, however, that a "full" SVD is unlikely to be required in practice, because in many practical contexts there will be a significant "null-space" which does not need to decomposed: e.g. for N<M (fewer rows than columns), the final M−N rows will be all zeros—in which case, a more efficient SVD can be performed by computing D as an N×N diagonal matrix, and U as an M×N matrix (so called "thin" SVD). As is known in the art, other forms of reduced SVD may be applied, for example "compact" SVD may be appropriate where D has a number N−r of zero-valued diagonal components (implying a rank r less than n), and U, D and $V^T$ are computed as M×r, r×r and r×N matrices respectively.

There is an important distinction, however, between a "truncated" SVD and a "reduced" SVD. The examples of the preceding paragraph are forms of reduced but non-truncated SVD, i.e. they are exactly equivalent to a full SVD decomposition, i.e. Z is still exactly equal to $UDV^T$ notwithstanding the dimensionality reduction.

By contrast a truncated SVD implies a dimensionality reduction such that Z is only approximated as $$Z \approx Z_K = U_K D_K V_K^T,$$

in which $U_K$, $D_K$ and $V_K^T$ have dimensions M×K, K×K and K×N respectively. Note, the matrix $Z_K$—the "reduced-rank approximation" of Z—has the same dimensions M×N as the original matrix Z but a lower rank than Z (i.e. fewer linearly-independent columns). Effectively, this approximation is achieved by discarding the r−K smallest singular values of D (r being the rank of D), and truncating the rows and columns of U and V respectively.

In general, notationally, U, D an V indicate a non-truncated (i.e. exact) SVD decomposition (which may or may not be reduced); $U_K$, $D_K$ and $V_K$ denote a truncated SVD of order K. As will be appreciated, an appropriate "stopping rule" may be used to determine K. For example, a convenient stopping rule retains only components with eigenvalues greater than 1, i.e. K is chosen such that $D_K > 1$ and $D_{K+1} \leq 1$.

In the first stage of the described anomaly detection method, a first-pass, truncated SVD is applied (FIG. 6, step 604) to a data matrix X, represented in mathematical notation as $$X_K = U_{1,K} D_{1,K} V_{1,K}^T, \quad (1)$$

In the second stage, a second-pass SVD is applied (FIGS. 7A, step 702) to a residuals matrix R, represented as $$R = U_2 D_2 V_2^T, \quad (2)$$

where the residuals matrix is defined as $$R = X - X_K,$$

i.e. as the matrix difference between the data matrix X and its reduced-rank approximation $X_K$ as computed in the first-pass SVD. The above notation assumes the second-pass SVD is non-truncated, however in practice the second-pass SVD may also be truncated for efficiency.

The subscripts 1 and 2 are introduced in Equations (1) and (2) above to explicitly distinguish between the first and second-pass SVDs. Note, however, elsewhere in this description, and in the Figures, these subscripts are omitted for conciseness, and the notation therefore reverts to U, D, V (non-truncated) and $U_K$, $D_K$, $V_K$ (truncated) for both the first and second passes—it will be clear in context whether this notation represents the SVD matrices of the first pass (as applied to the data matrix X—see Equation (1)) or the SVD matrices of the second-pass (as applied to the residuals matrix R—see Equation (2)).

Although not explicitly indicated in the notation, it will be appreciated that appropriate normalization may be applied to the data matrix X and the residuals matrix R in the first and second-pass SVD respectively. Different types of normalization can be applied. SVD is a class of decomposition that encompasses various more specific forms of decomposition, including correspondence analysis (CA), principal component analysis (PCA), log-ratio analysis (LRA), and various derived methods of discriminant analysis. What distinguishes the various methods is the form of the normalization applied to Z (e.g. X or R) before performing the SVD.

3A. First Stage—Anomaly Detection

Figure 6:
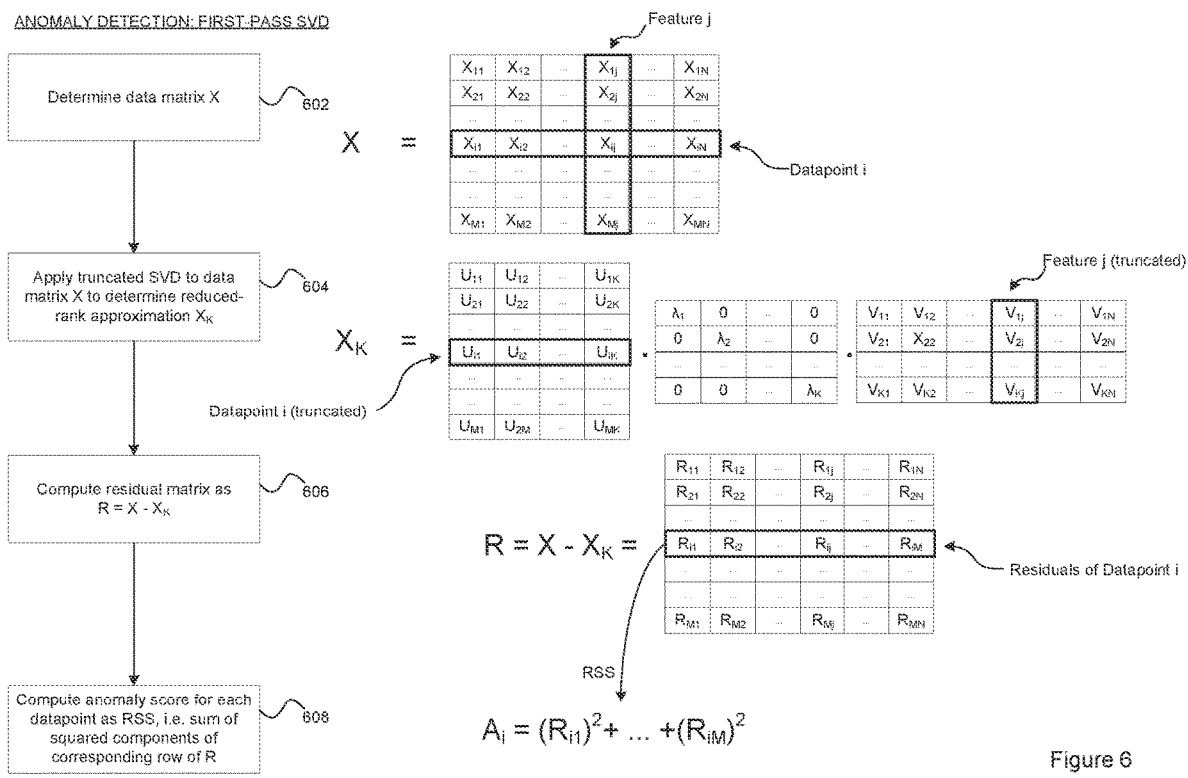
FIG. 6 shows a flow chart for an anomaly detection stage.

FIG. 6 shows, on the left-hand side, a schematic flow chart for the first stage of the method, i.e. the anomaly detection phase. The right-hand side schematically illustrates an application of the method steps.

At step 602, a data matrix X is determined. This represents a set of datapoints as rows of the data matrix X, i.e. each row of X constitutes one data point. Each column X represents a particular feature. Hence, an M×N data matrix X encodes M data points as rows, each having N feature values. Component $X_{ij}$ in row i and column j is the value of feature j (feature value) for data point i. Note the terms "row" and "column" are convenient labels that allow the subsequent operations to be described more concisely in terms of matrix operations. Data may be said to be "structured" as a M×N data matrix" or similar, but the only implication of this language is that each datapoint of the M datapoints is expressed as respective values of a common set of N features to allow those features to be interpreted in accordance with the anomaly detection/reasoning techniques disclosed herein. That is to say, the terminology does not imply any additional structuring beyond the requirement for the datapoints to be expressed in terms of a common feature set.

By way of example, column j of the data matrix X is highlighted. This corresponds to a particular feature in the feature set (feature j), and the M values of column j are feature values which characterize each of the M datapoints in relation to feature j. This applies generally to any column/feature.

Note, the terms "feature" and "variable" may be used interchangeably in this context.

In the present context, each datapoint (row i) could for example correspond to an observed event (network or endpoint), and its feature values $X_{i1}, \ldots, X_{iM}$ in rows 1 to M) characterise the observed event in relation to features 0 to M. As another example, each datapoint could represent multiple events (network and/or endpoint), and in that case the feature values $X_{i1}, \ldots, X_{iM}$ characterize the set of events as a whole. For example, each datapoint could represent a case relating to a single event or to multiple events, and the feature values $X_{i1}, \ldots, X_{iM}$ could characterise the case in terms of the related event(s).

The term "observation" is also used to refer to a datapoint (noting that, in a cybersecurity application, an observation in this sense of the word could correspond to one or multiple events of the kind described above; elsewhere in this description, the term observation may be used to refer to a single event. The meaning will be clear in context.)

At step 604, the first-pass SVD is applied to the data matrix X, as in Equation (1) above, which in turn allows the residuals matrix $R = X - X_K$ to be computed at step 606.

At step 608, the residuals matrix R is used to identify any anomalous datapoint in X as follows. An anomaly score $A_i$ is computed for each datapoint i as residual sum of squares (RSS), defined as $$A_i = \sum_{j=1}^{M} R_{ij}^2,$$

i.e. as the sum of the squares of the components of row i of the residuals matrix R (the residuals for datapoint i).

Any datapoint with a threat score $A_i$ that meets a defined anomaly threshold A is classed as anomalous. As will be appreciated, a suitable anomaly threshold A can be set in various ways. For example, the anomaly threshold may be set as a multiple of a computed interquartile range (IQR) of the anomaly scores. For example, a Tukey boxplot with an outlier threshold of 3×IQR may be used, though it will be appreciated that this is merely one illustrative example.

In the above context, where network/endpoint events are grouped into cases, the threat score 506 associated with a case 502 may, for example, be (a function of) the anomaly score associated with the set of events as a whole (treated as a single datapoint for the purpose of anomaly detection) or (a function of) the individual anomaly scores for the event(s) to which the case relates (treated as separate datapoints for the purpose of anomaly detection).

Intuitively, anomalous datapoints are datapoints for which the approximation $X_K$ "fails"—leading to a significant discrepancy between the corresponding rows of X and $X_R$, culminating in a relatively high anomaly score.

3B. Second Stage—Anomaly Reasoning

Figure 7A:
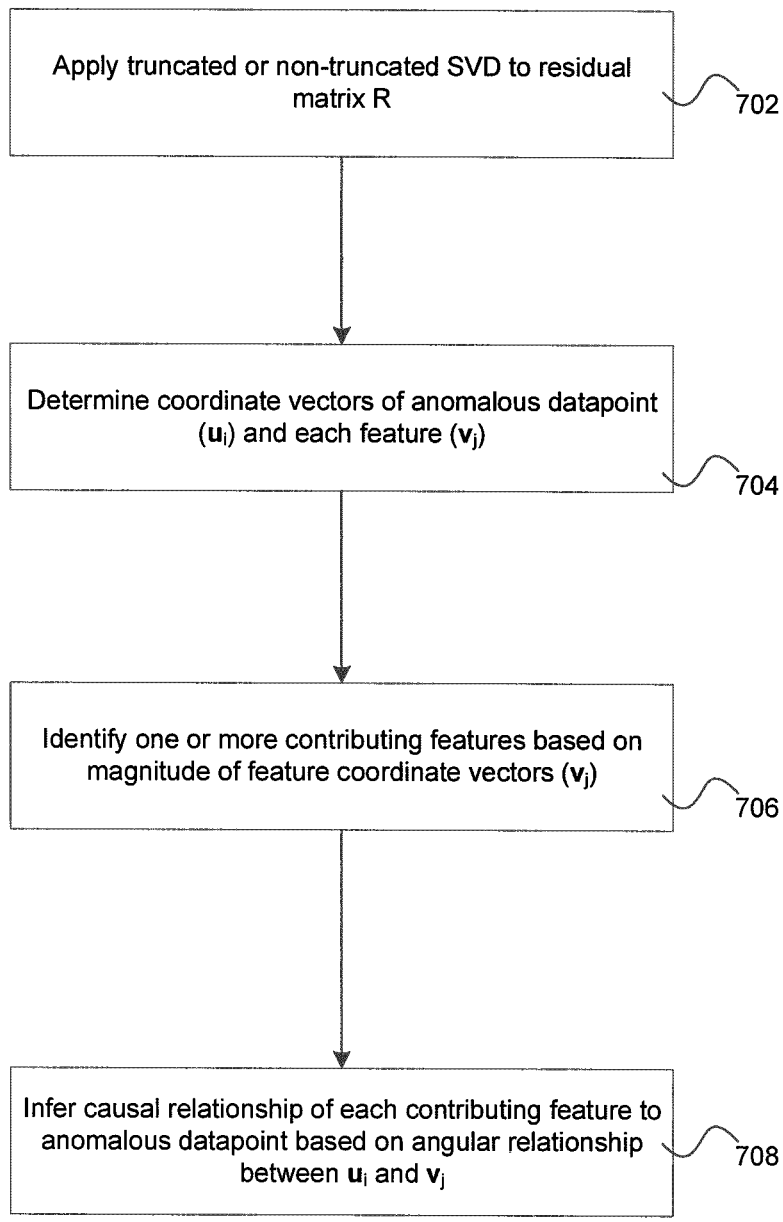
FIG. 7A shows a flow chart for an anomaly reasoning stage and FIG. 7B shows an example of the steps applied in practice.
Figure 7B:
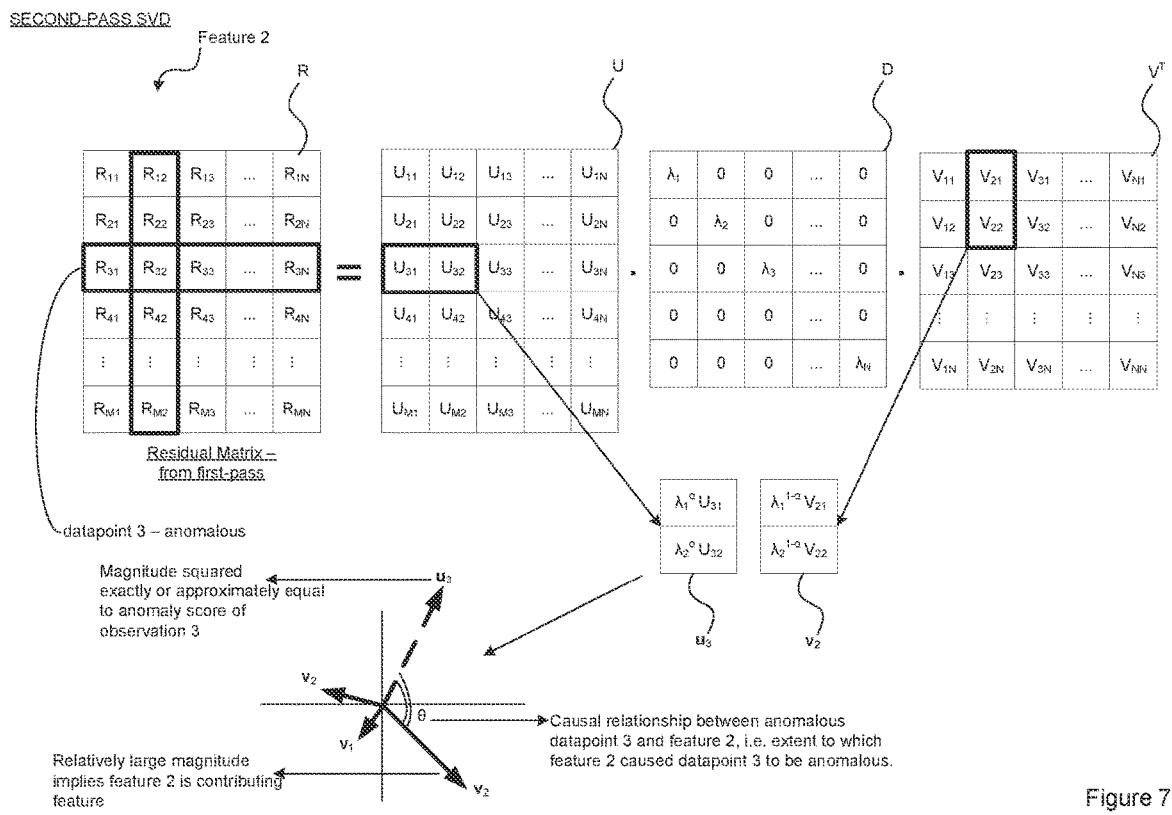

FIG. 7A shows a schematic flow chart for the steps of the second stage of the method. FIG. 7B provides an illustrative example of how those steps might be applied. For the purpose of the following description, it is assumed that at least one datapoint is identified as anomalous in the first stage of the method, i.e. it is assumed at least one datapoint has an anomaly score $A_i$ which meets the anomaly threshold A.

At step 702, a second-pass SVD is applied to the residuals matrix R as computed in the first stage at step 606. That is to say, the residuals matrix R of the first-pass is decomposed as set out in Equation (2).

At step 704, "coordinate vectors" of both the datapoints and the features are determined. The coordinate vector of a given datapoint i is denoted by $u_i$ (corresponding to row i of X) and the coordinate vector of a given feature j is denoted by $v_j$ (corresponding to column j of X). The coordinate vectors are computed as follows (the first line of the following repeats equation (2) for reference):

$$R = UDV^T$$

$$v_j = \text{col}_j[V^T]$$

$$u_i^T = \text{row}_i[UD]$$

where "$\text{col}_j[V^T]$" means column j of the matrix $V_j$ or the first P components thereof, and "$\text{row}_i[UD]$" means row i of the matrix UD (i.e. the matrix U matrix-multiplied with the matrix of singular values D) or the first P components thereof. The integer P is the dimension of the coordinate vector space (i.e. the vector space of $u_i$ and $v_j$), which in general is less than or equal to the number of rows in UD (the number of rows in UD being equal to the number of columns in V).

For a "full-rank" coordinate vector space, P is at least as great as the rank of D.

Because of the way in which the SVD is structured—and, in particular, because D is defined as having non-increasing singular values along the diagonal—the greatest amount of information is contained in the first component (i.e. in the left-most components of U, and the top-most components of $V^T$). Hence, it may be viable in some contexts to discard a number of the later components for the purpose of analysis.

The coordinate vector $u_i$ may be referred to as the "observation coordinate vector" of datapoint (observation) j; the coordinate vector $v_j$ may be referred to as the "feature coordinate vector" of feature j.

The above is a special case of a more general definition of the coordinate vectors. More generally, the coordinate vectors may be defined as:

$$v_j = \text{col}_j[(VD^{1-\alpha})^T]]$$

$$u_i^T = \text{row}_i[UD^\alpha]$$

where the above is the special case of $\alpha=1$. As with D, $D^\alpha$ and $D^{1-\alpha}$ each has no non-zero off diagonal components, and their diagonal components are:

$$\text{diag } D^\alpha := (D_0^\alpha, \ldots D_N^\alpha),$$

$$\text{diag } D^{1-\alpha} := (D_0^{1-\alpha}, \ldots D_N^{1-\alpha}).$$

The case of $\alpha=1$ is assumed throughout this description. However, the description applies equally to coordinate vectors defined using other values of $\alpha$. For example, $\alpha=0$ and $\alpha=0.5$ may also be used to define the coordinate vectors.

At step 706, one or more "contributing" features are identified. A contributing feature means a feature that has made a significant causal contribution to the identification of the anomalous datapoint(s) in the first stage. Assuming multiple anomalous datapoints have been identified, the aim at this juncture is not to tie specific anomalous datapoints to particular features, but rather to identify features which contribute to the identification of anomalies as a whole.

A feature j is identified as a contributing feature in the above sense based on the magnitude of its feature coordinate vector $v_j$. The magnitude of the feature coordinate vector, $|v_j|$, gives a relative importance of that feature j in relation to the detected anomalies.

For example, it may be that only feature(s) with relative coordinate vector magnitude(s) above a defined threshold are classed as causally relevant to the detected anomaly/anomalies.

Alternatively, it may be that only a defined number of features as classed as causally relevant, i.e. the features with the highest magnitude feature coordinate vectors.

For a non-truncated (exact) second-pass SVD of the residuals R, the magnitude squared of the observation coordinate vector $|u_i|^2$ is exactly equivalent to the threat score $A_i$, i.e.

$$A_i = |u_i|^2.$$

For a truncated second-pass SVD, this relationship holds approximately, i.e.

$$A_i \approx |u_i|^2.$$

Hence, the anomaly scores used at step 608 may be computed exactly or approximately as $$(UD)^2$$

where $A_i$ is computed exactly or approximately as component i of the vector $(UD)^2 = (|u_1|^2, |u_2|^2, |u_3|^2 \ldots )$.

More generally, the anomaly score $A_i$ can be any function of the components of row i or R or any function of row i of UD that conveys similarly meaningful information as the RSS.

Contributing feature(s) in the above sense may be referred to as the anomaly detection "drivers".

Having identified the anomaly detection drivers, at step 708, a causal relationship between each anomalous datapoint i and each contributing feature j is identified, based on an angular relationship between the coordinate vector of that datapoint $u_i$ and the coordinate vector of that feature $v_j$. Specifically, a Pearson correlation between that datapoint and that feature is determined as the cosine similarity of those vectors (the latter being provably equivalent to the former), i.e. as $$\cos\theta = \frac{u_i \cdot v_j}{|u_i||v_j|}.$$

For a full-rank coordinate vector space, the cosine is exactly equal to the Pearson correlation coefficient; for a reduced-rank coordinate vector space (P less than the rank of D), this relationship is approximate.

A small cosine similarity close to zero (θ close to 90 or 270 degrees) implies minimal correlation—i.e., although feature j might be a driver of anomalies generally, it has not been a significant causal factor in that particular datapoint j being anomalous, i.e. it is not a causal feature of anomalous datapoint i specifically.

By contrast, a cosine similarity close to one (θ close to 0 or 180 degrees) implies a high level of correlation—i.e. feature j has made a significant contribution to datapoint i being identified as anomalous, i.e. it is a causal feature of anomalous datapoint i specifically. A negative (resp. positive) cosine indicates the feature in question is significantly smaller (resp. larger) than expected, and that is a significant cause of the anomaly.

4. Classification Enhancement

An enhancement of the above anomaly detection and reasoning method will now be described. The enhanced method includes an initial classification stage, the results of which feed into the first and second pass SVDs. As explained below, this enhancement can provide a significant performance improvement.

Figure 8:
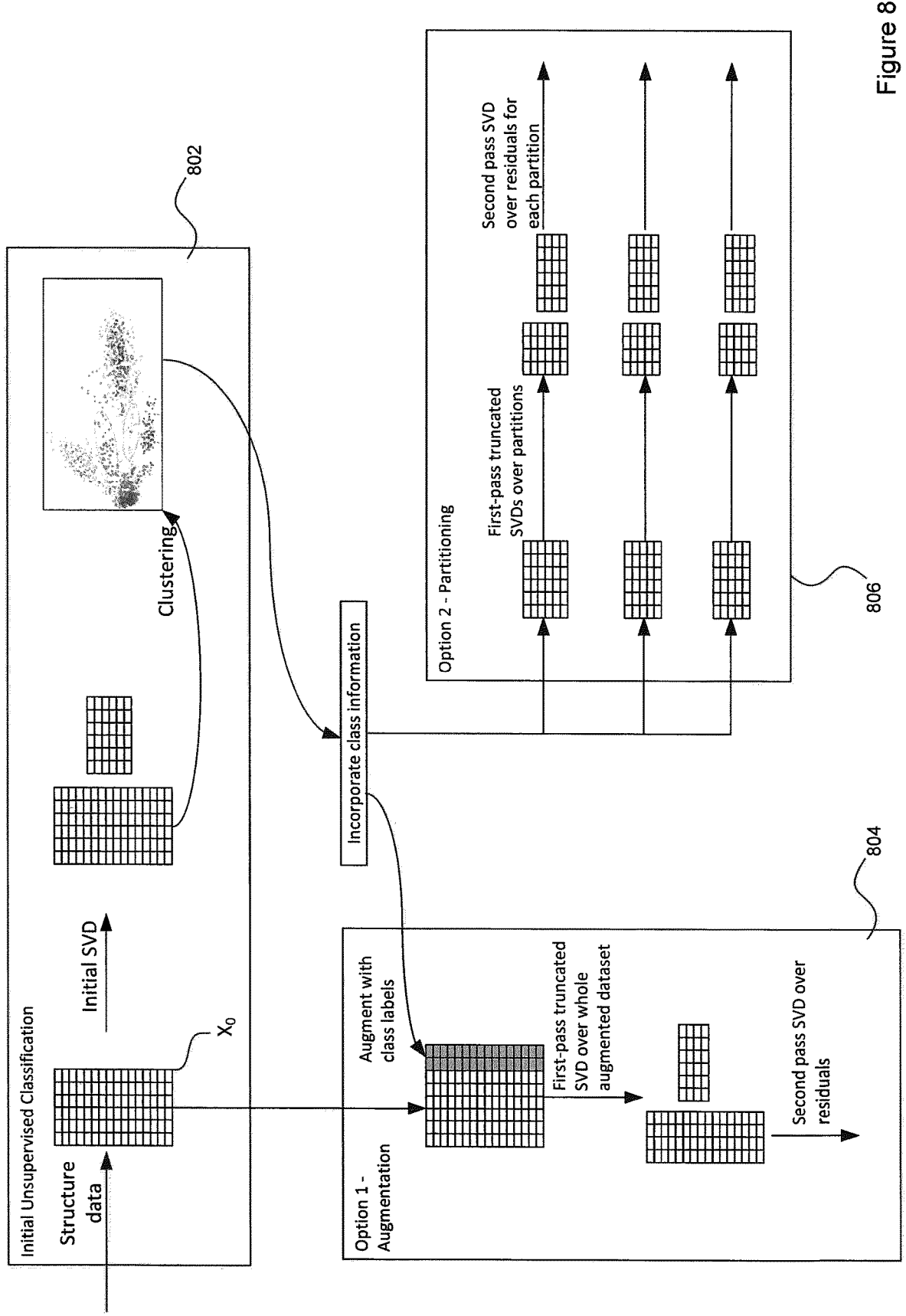
FIG. 8 shows a schematic overview of an enhanced anomaly detection and reasoning process having an initial classification stage, with two example options for incorporating the results of the initial classification into the anomaly detection and reasoning process.

FIG. 8 shows a schematic overview of the enhanced anomaly detection and reasoning method incorporating an initial classification stage denoted by reference numeral 802.

A cybersecurity dataset is structured as an initial data matrix $X_0$ for the purpose of the initial classification. As above, each row corresponds to a datapoint and the columns contain feature values. Prior to performing anomaly detection and reasoning via first and second pass SVDs, an unsupervised classification algorithm is applied to classify each datapoint in relation to a set of (unknown) classes. The method is unsupervised in that the classes are not pre-determined and the classification does not rely on knowledge learned from known class samples. Rather, classes are determined solely on the basis of patterns in the dataset itself.

In the present example, the unsupervised classification proceeds by first applying an initial SVD to the initial data matrix $X_0$ as:

$$X_0 = U_0 D_0 V_0^T.$$

All of the above general description of SVD applies here as well. This initial SVD may be non-truncated, in which case the equality holds exactly, or truncated, in which case it holds only approximately. This, in turn, allows a coordinate vector to be assigned to each datapoint (row) of $X_0$ in the same way as described above (again, using any value of $\alpha \in [0,1]$, e.g. $\alpha=1$, $\alpha=0$ or $\alpha=0.5$). Unsupervised clustering is then applied to those datapoint coordinate vectors, to assign each datapoint to one of a set of clusters (classes). For example, k-means clustering may be applied to the coordinate vectors.

The class information (i.e. the assignment of datapoints to clusters) can be incorporated into the subsequent anomaly detection and reasoning in various ways. Two options are considered by way of example.

A first option is denoted by reference numeral 804, and involves augmenting the initial data matrix $X_0$ with one or more additional classification feature rows. That is, the results of the initial classification 802 are added to the data matrix additional feature(s) (classification feature(s)).

In the present example, the clustering is deterministic, i.e. each datapoint is assigned deterministically to one cluster only. With deterministic classification, class labels may be binary-encoded (for example). As another example, class labels may be encoded as "one-hot" features. If the initial classification 802 is instead probabilistic, i.e. each datapoint is assigned a probability of belonging to each class, the same principles apply, but in this case the class features could encode a probability distribution over classes for each datapoint (for example). In the case of the first option 804, the data matrix X to which the first-pass SVD is applied (as in FIG. 6) is the augmented data matrix, i.e. X is obtained by adding the classification features(s) to $X_0$. This means a single first-pass SVD is applied over the whole of the (augmented) data set.

A second option, denoted by reference numeral 806, is to partition the original dataset based on the results of the initial classification 802. In that case, rather than adding features to the initial data matrix $X_0$, $X_0$ is partitioned into a set of smaller matrices ("matrix partition"), each containing a subset of datapoints of $X_0$ belonging to a single cluster only, and each of which is subject to separate first and second pass SVDs. That is, the steps of FIG. 6 (first pass) and the FIG. 7A (second pass) are applied separately to each partition, with X being the matrix partition for the relevant cluster.

However it is incorporated, incorporating class information from unsupervised clustering has the benefit of significantly reducing false-positive anomaly detections.

In a cybersecurity context, false positives are, to an extent, reflective of the nature of the "messy" real-world data that usually needs to be analysed. However, identifying too many observations as unusual or anomalous (i.e. excessive false positives), when most are benign and explainable, creates an unsustainable load on analysts and is a distraction from real malevolent attacks. Reducing false positives reduces this burden significantly and ultimately increases the chances of genuinely harmful or malevolent threats being detected by an analyst in a sufficiently timely manner.

Note, the entire process from the initial classification to the second-pass anomaly reasoning stage is unsupervised—no training is required, which provides enormous flexibility in terms of the data the system is able to handle.

However, it is also noted that this does not exclude the use of trained models altogether. For example, in some implementations at least some of the feature values may be extracted from the collected data using trained feature extractors (although this is not essential; features can be assigned in any suitable manner).

5. Illustrative Results

Enhanced anomaly detection has been applied to a dataset of ~4.3 million records for 1,293 devices (data points) and 1,088 processes (features) collected on a corporate network over one week. That is to say, in this case, each datapoint corresponds to an endpoint (device) and the features capture information about processes running on the endpoints in a structured format. Information about the processes is used to automatically identify anomalous endpoints, and the reasons for them being anomalous. For example, the features may identify which processes have been running on which endpoints and, optionally, additional information such as timing, frequency etc. In the present examples, the features capture which processes have run on the endpoints and at what frequency.

The results are shown in FIGS. 9A to 9D. These results have been generated using the enhanced process of FIG. 8, with the classification results being incorporated as additional features (i.e. the first option 804 in FIG. 8).

The analysis illustrates the following: (i) clustering of data points (802, FIG. 8), (ii) enhanced anomaly detection (804, FIG. 8), and (iii) reasoning over the features of anomalies to understand their causes (via the method of FIG. 6).

Figure 9A:
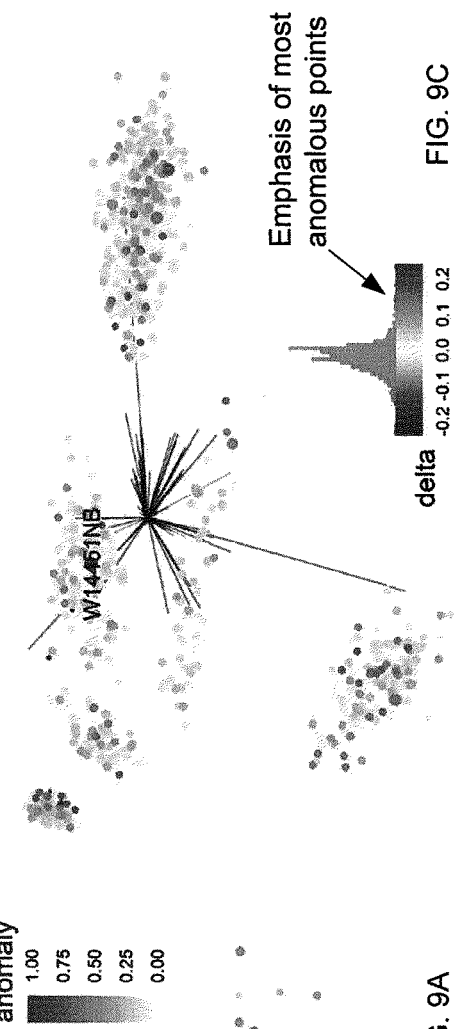
FIGS. 9A to 9D shows results of the anomaly detection and reasoning techniques described herein applied to a large cybersecurity dataset.

FIG. 9A shows coordinate vectors of datapoints (devices) and features (processes) plotted together in the first two dimensions of the model. Features are plotted as vectors indicating strength and direction of influence on the location of data points. Anomalies are shown as darker points coloured to indicate anomaly scores, according to the scale shown at the top-right of FIG. 9A.

The datapoints of FIG. 9A are datapoints of the original data matrix $X_0$ prior to classification 802. For the purpose of illustration, a first-pass SVD has been applied and anomaly scores have been assigned to these datapoints without the initial classification 802 to provide a baseline, in order to obtain the results plotted n FIG. 9A. It is observed that a relatively large number of datapoints have high or relatively high anomaly scores.

Figure 9B:
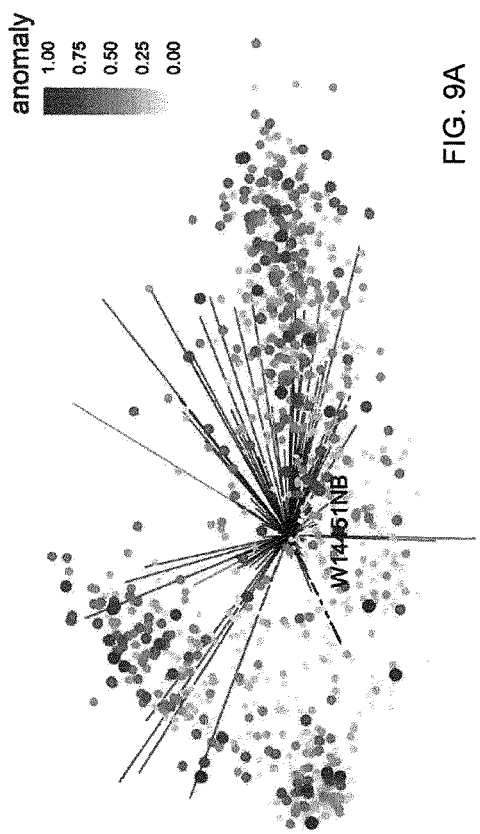

FIG. 9B shows the results of the initial clustering 802 applied to this dataset. The devices on this network cluster naturally into seven groups based on the frequency and combination of processes that they execute.

Figure 9C:
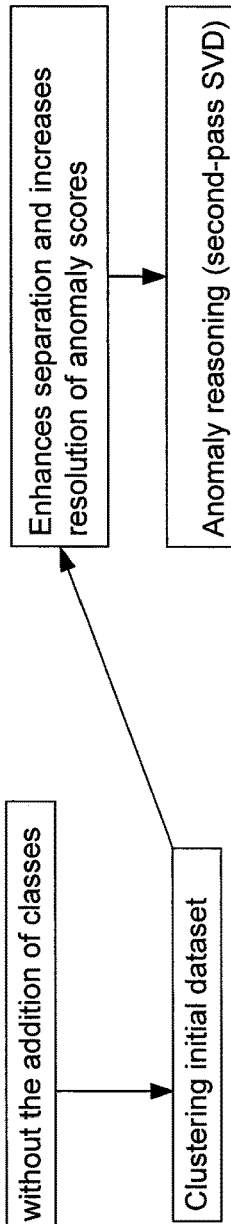

To obtain the results shown in FIG. 9C, binary encoded vectors for each cluster were added to the original feature set and the anomaly detection (first-pass SVD) was re-performed, i.e. using the first option 804 described above.

FIG. 9C shows how the addition of unsupervised classification information (derived through clustering) enhances the separation of seven groups (clusters). Moreover, the anomaly score for most datapoints decreases, but unevenly, increasing for a few. This increases the "resolution" of the anomalous scores, by emphasizing true anomalies. That is, the initial classification 802 provides additional information about what "normal" datapoints in a given class should look like, with the consequence that anomalous datapoint in a particular class are more heavily emphasised by the first-pass SVD (or, to put it another way, the first-pass SVD is now more sensitive to datapoints that exhibit discrepancies from the majority of datapoints in the same class). Without this additional resolution, a model could over-estimate anomaly scores from background data.

Figure 9D:
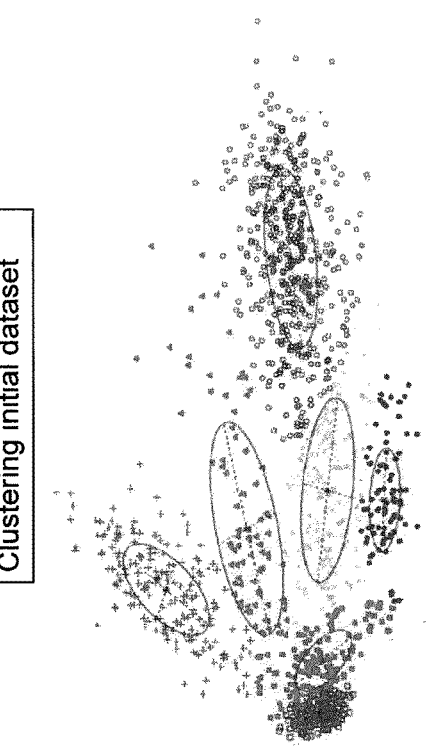

Finally, FIG. 9D shows the results of the second pass SVD (anomaly reasoning) applied to the results of FIG. 9C. This automates the process of understanding what caused an observation to be anomalous. Feature vectors now show strength and direction of influence on the model errors.

Figure 10:
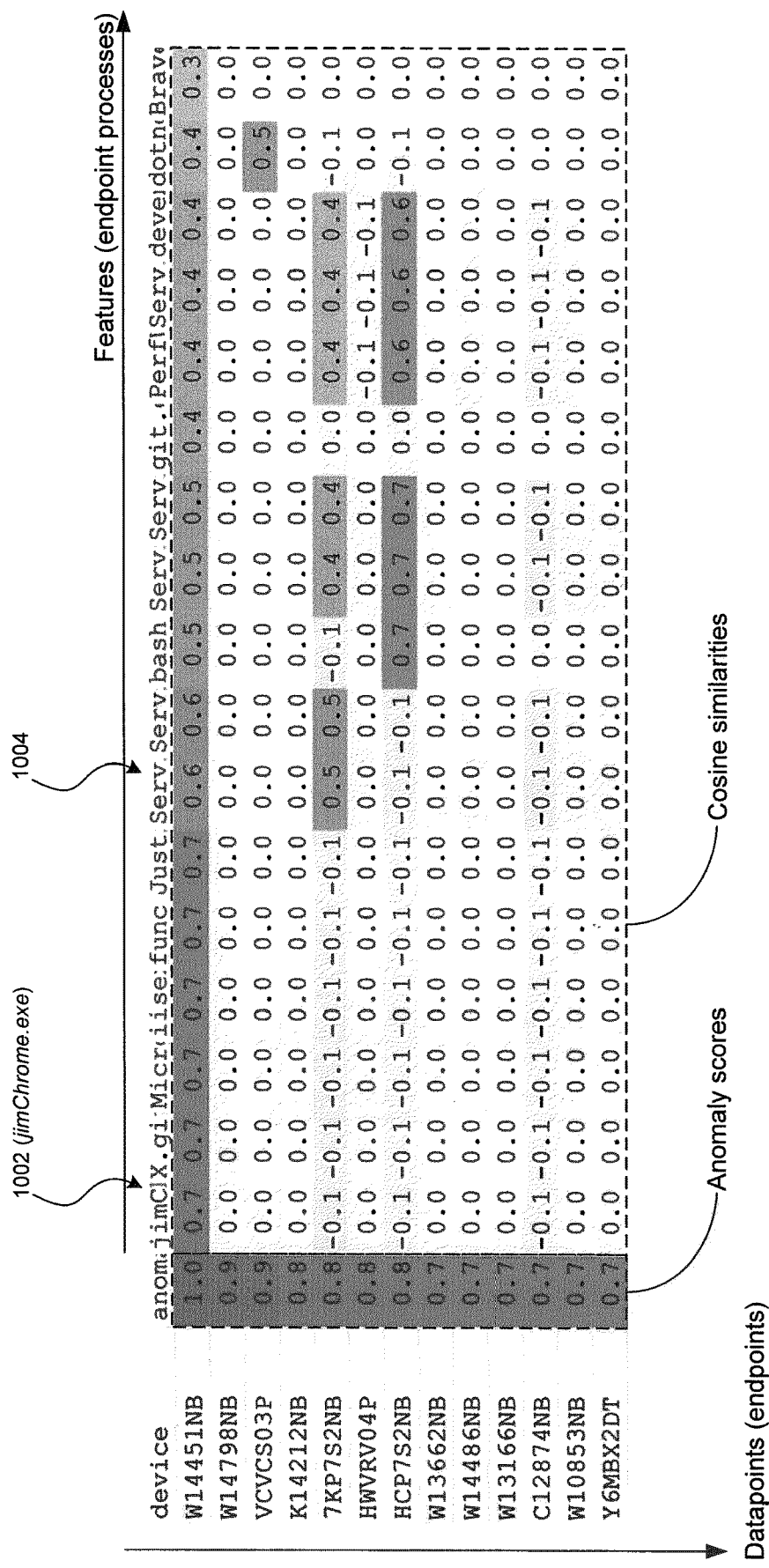
FIG. 10 shows a selection of the results of FIG. 9D in tabular format.

FIG. 10 shows a selection of the results of FIG. 9C in tabular format. Each row corresponds to a particular endpoint having a hexadecimal identifier. The first column shows the anomaly score $A_i$ for each endpoint i derived as above. The remaining columns contain the cosine similarities with respect to the process-related features, i.e. the value in row i and column j=1 is the anomaly score for endpoint j and the value in row i and column j>1 is the cosine similarity between the second-pass coordinate vector $u_i$ of that endpoint and the second-pass coordinate vector $v_j$ of feature j. As set out above, it is this value that indicates the extent to which that features caused that device to be anomalous.

The most extreme anomaly found was device W14451NB. It was identified as anomalous because it executed certain processes that single it out as being unusual relative to other devices with similar behaviour (e.g. the process "jimChrome.exe" and a few others). If any of these appear suspicious then this device would definitely be worth investigating further.

The "jimChrome.exe" feature is denoted by reference numeral 1002.

Turning to, say, endpoint 7KP7S2NB (row 5), it can be seen that fewer features have caused that datapoint to be anomalous, e.g. unlike endpoint W14451NB, feature 1002 (jimChrome.exe) does not appear to have been a significant factor in the relatively high anomaly score (0.8) assigned to that endpoint; however, the feature denoted by reference numeral 1004 has been a significant factor (cosine similarity of 0.5), as have a few other features.

6. Other Example Cybersecurity Implementations

The above examples consider datapoints which correspond to endpoints, with the features capturing information about multiple processes running on the endpoints (process data being a form of endpoint data). However, it will be appreciated that different forms of datapoint/features can be usefully analysed in a cybersecurity context.

For example, a useful analysis can be applied to detect anomalies linked to network behaviour/traffic (with the features derived at least in part from network data).

As a first example, the datapoints may correspond to endpoints as above, but the features may relate to network activity. Using the above dataset as an example, a useful analysis may be performed by partitioning the dataset according to processes (i.e. each partition corresponding to a particular process—so each datapoint corresponds to a specific process on a specific endpoint, i.e. a particular instance of that process). Then, for each process partition, an analysis can be performed of network activity at each endpoint resulting from the corresponding process. Features are extracted for each process instance which, for example, indicate network addresses (e.g. IP addresses, DNS addresses etc.) accessed by the corresponding process on the corresponding endpoint. This, in turn, allows anomalous process instances to be detected, and anomaly reasoning can be used to assist in the determination of the cause of the anomalous process instances.

As a second example, the datapoints could correspond to respective addresses in an address space (e.g. IP addresses, DNS addresses etc.). Features could be extracted in order to capture information about network traffic to and/or from each network address. Anomaly detection can then be applied to detect anomalous addresses and anomaly reasoning can be used to assist in the determination of the causes of the anomalous addresses.

More generally, in a cybersecurity context, datapoints can correspond to any form of entity that may be usefully analysed, and any suitable feature set may be used to characterize the datapoints using network data, endpoint data or a combination of both. A benefit of the unsupervised techniques is that they are generally applicable and not restricted to specific types of datapoint or to specific features.

7. Other Example Applications

Whilst the above focuses on cybersecurity applications, the usefulness of the enhanced anomaly detection and anomaly reasoning techniques described herein are not limited to cybersecurity. It will be appreciated that the explainability benefits provided by the anomaly reasoning techniques are useful in many technical contexts, and the same applied to the enhanced anomaly detection techniques.

As a first example, one or both of the techniques could be applied in the context of image classification or similar image processing/interpretation. In that context, anomaly detection could, for example, be used to detect any images that are anomalous with respect to a particular image class, and anomaly reasoning can be applied to determine the cause of such anomalies in terms of image features. In the enhanced anomaly detection and reasoning process, image classification results could be used to augment or partition an image data set (as applicable) applying the same principles as described above in relation to FIG. 8.

As a second example, the techniques may be usefully applied in an engineering context, for example in the field of engineering prognostics. This refers to the early detection of machine faults. Anomaly detection could be used as a means of early fault detection and anomaly reasoning could be used to help diagnose the cause of faults.

As a third example, the techniques may be usefully applied to medical data; for example, as a diagnostic aide. Anomalous datapoints could indicate potential health issues and anomaly reasoning could be applied to help a medical expert understand the causes.

Reference is made in the above to a computer and a computer system comprising one or more such computers configured to implement the disclosed steps. A computer comprises one or more computer processors which may take the form of programmable hardware, such as a general-purpose processor (e.g. CPU, accelerator such as a GPU etc.) or a field programmable gate array (FPGA), or any other form of programmable computer processor. A computer program for programming a computer can thus take the form of executable instructions for execution on a general-purpose processor, circuit description code for programming an FPGA etc. Such program instructions, whatever form they take, may be stored on transitory or non-transitory media, with examples of non-transitory storage media including optical, magnetic and solid-state storage. A general-purpose processor may be coupled to a memory and be configured to execute instructions stored in the memory. The term computer processor also encompasses non-programmable hardware, such as an application specific integrated circuit (ASIC).

It will be appreciated that, whilst the specific embodiments of the invention have been described, variants of the described embodiments will be apparent to the skilled person. The scope of the invention is not defined by the described embodiments but only by the appendant claims.

The invention claimed is:

1. A computer-implemented method of detecting potential cybersecurity threats from a cybersecurity dataset, the method comprising:
structuring the cybersecurity dataset as a first data matrix, each row of the first data matrix being a datapoint and each column corresponding to a feature;
applying an unsupervised classification process to the first data matrix to classify each datapoint in relation to a set of classes;
based on the unsupervised classification process, re-structuring the cybersecurity dataset as a second data matrix; and
applying anomaly detection to the second data matrix, the anomaly detection incorporating class information obtained in the unsupervised classification process, wherein the anomaly detection comprises identifying a datapoint of the second data matrix as anomalous using a residuals matrix, the residuals matrix computed between the second data matrix and an approximation of the second data matrix, by applying a truncated singular value decomposition (SVD) to the second data matrix,
wherein the datapoint is identified as anomalous based on:
a row of the residuals matrix corresponding to the datapoint, or
a second-pass coordinate vector of the datapoint, as determined by applying a applying a second-pass SVD to the residuals matrix.

2. The method of claim 1, wherein the datapoint is identified as anomalous based on:
a sum of squared components of the row of the residuals matrix corresponding to the datapoint, or
a sum of squared components of the second-pass coordinate vector.

3. The method of claim 1, wherein re-structuring the cybersecurity dataset comprises populating the first data matrix with one or more classification features, resulting in the second data matrix that includes the one or more classification features in one or more additional columns.

4. The method of claim 1, wherein the unsupervised classification process comprises:
applying an initial SVD to the first data matrix, to determine initial coordinate vectors for respective rows of the first data matrix, and
applying an unsupervised clustering algorithm to the initial coordinate vectors to determine a plurality of clusters of the initial coordinate vectors.

5. The method of claim 4, wherein re-structuring the cybersecurity dataset comprises populating the first data matrix with a cluster label for each data point, resulting in the second data matrix that contains the cluster label in one or more additional columns, the cluster label determined by the unsupervised clustering algorithm.

6. The method of claim 5, wherein the cluster label is deterministic and is encoded in the one or more additional columns as a binary or one-hot value.

7. The method of claim 5, wherein the cluster label is probabilistic and is encoded as a probability distribution in the one or more additional columns.

8. The method of claim 1, wherein re-structuring the cybersecurity dataset comprises:
partitioning the cybersecurity dataset into multiple partitions based on the unsupervised classification process, wherein the second data matrix corresponds to a single partition of the multiple partitions, wherein the residuals matrix is specific to the single partition.

9. The method of claim 8, wherein the cybersecurity dataset is restructured as a plurality of second data matrixes, each second data matrix corresponding to a different single partition of the multiple partitions, the method comprising applying anomaly detection to each second data matrix based on a residuals matrix specific thereto.

10. The method of claim 8, wherein the unsupervised classification process comprises:

applying an initial SVD to the first data matrix, to determine initial coordinate vectors for respective rows of the first data matrix, and applying an unsupervised clustering algorithm to the initial coordinate vectors to determine a plurality of clusters of the initial coordinate vectors, each partition corresponding to a single cluster.

11. The method of claim 1, wherein the cybersecurity dataset comprises collected data pertaining to a monitored network, the collected data comprising at least one of network data and endpoint data.

12. The method of claim 1, comprising:

extracting causal information about the datapoint identified as anomalous based on an angular relationship between a second-pass coordinate vector of the datapoint and a second-pass coordinate vector of at least one of the features, the second-pass coordinate vectors determined by applying a second-pass SVD to the residuals matrix.

13. The method of claim 1 comprising:

causing an alert to be generated based on identifying the datapoint as anomalous.

14. The method of claim 1, wherein the classes are determined in the unsupervised classification process based on patterns exhibited in the cybersecurity dataset.

15. A computer system comprising:

at least one memory embodying computer-readable instructions;

at least one hardware computer processor coupled to the at least one memory and configured to execute the computer-readable instruction, which upon execution cause the at least one hardware computer processor to implement operations comprising:

structuring a cybersecurity dataset as a first data matrix, each row of the first data matrix being a datapoint and each column corresponding to a feature;

applying an unsupervised classification process to the first data matrix to classify each datapoint in relation to a set of classes;

based on the unsupervised classification process, re-structuring the cybersecurity dataset as a second data matrix; and applying anomaly detection to the second data matrix, the anomaly detection incorporating class information obtained in the unsupervised classification process, wherein the anomaly detection comprises identifying a datapoint of the second data matrix as anomalous using a residuals matrix, the residuals matrix computed between the second data matrix and an approximation of the second data matrix, by applying a truncated singular value decomposition (SVD) to the second data matrix, wherein re-structuring the cybersecurity dataset comprises populating the first data matrix with one or more classification features, resulting in the second data matrix that includes the one or more classification features in one or more additional columns.

16. The computer system of claim 15, wherein the datapoint is identified as anomalous based on:

a row of the residuals matrix corresponding to the datapoint, or a second-pass coordinate vector of the datapoint, as determined by applying a applying a second-pass SVD to the residuals matrix.

17. A non-transitory computer-readable medium comprising program instructions configured, upon execution by one or more hardware computer processors, to cause the one or more hardware computer processors to implement operations comprising:

determining a first data matrix from a set of collected data, each row of the first data matrix being a datapoint and each column corresponding to a feature;

applying an unsupervised classification process to the first data matrix to classify each datapoint in relation to a set of classes;

based on the unsupervised classification process, re-structuring the cybersecurity dataset as a second data matrix; and and applying anomaly detection to the second data matrix, the anomaly detection incorporating class information obtained in the unsupervised classification process, the anomaly detection comprising identifying at least one of the datapoints as anomalous using a residuals matrix, the residuals matrix computed between the second data matrix and an approximation of the second data matrix, by applying a truncated singular value decomposition (SVD) to the second data matrix, wherein re-structuring the cybersecurity dataset comprises:

partitioning the cybersecurity dataset into multiple partitions based on the unsupervised classification process, wherein the second data matrix corresponds to a single partition of the multiple partitions, wherein the residuals matrix is specific to the single partition.

18. The method of claim 17, wherein the unsupervised classification process comprises:

applying an initial SVD to the first data matrix, to determine initial coordinate vectors for respective rows of the first data matrix, and applying an unsupervised clustering algorithm to the initial coordinate vectors to determine a plurality of clusters of the initial coordinate vectors, resulting in a cluster label for each datapoint;

wherein re-structuring the collected data comprises populating the first data matrix with the cluster label for each data point, resulting in the second data matrix that contains the cluster label in one or more additional columns.

19. The method of claim 17, wherein the unsupervised classification process comprises:

applying an initial SVD to the first data matrix, to determine initial coordinate vectors for respective rows of the first data matrix, and applying an unsupervised clustering algorithm to the initial coordinate vectors to determine a plurality of clusters of the initial coordinate vectors;

wherein the cybersecurity dataset is restructured as a plurality of second data matrixes, by partitioning the cybersecurity dataset into multiple partitions based on the unsupervised classification process, each second data matrix corresponding to a different single partition of the multiple partitions, wherein anomaly detection is applied to each second data matrix based on a residuals matrix specific thereto.

* * * * *